(12) United States Patent
Dyer et al.

(10) Patent No.: US 10,537,983 B2
(45) Date of Patent: Jan. 21, 2020

(54) MODULAR POWER TOOL

(71) Applicant: BLACK & DECKER INC., New Britain, CT (US)

(72) Inventors: Kelly E. Dyer, Takoma Park, MD (US); Elyse Edwards, Aberdeen, MD (US); Mark Chou, Perry Hall, MD (US); Anthony Reth, Baltimore, MD (US); Erik Cussins, Forest Hill, MD (US); David A. Miller, Aberdeen, MD (US); Drake L. Fisher, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 149 days.

(21) Appl. No.: 15/635,044

(22) Filed: Jun. 27, 2017

(65) Prior Publication Data

US 2018/0104809 A1 Apr. 19, 2018

Related U.S. Application Data

(60) Provisional application No. 62/409,049, filed on Oct. 17, 2016.

(51) Int. Cl.
*B25F 3/00* (2006.01)
*A01D 34/416* (2006.01)
(Continued)

(52) U.S. Cl.
CPC ............. *B25F 3/00* (2013.01); *A01G 3/053* (2013.01); *A01G 3/086* (2013.01); *B27B 17/0016* (2013.01); *A01D 34/4165* (2013.01)

(58) Field of Classification Search
CPC ....... B25F 3/00; A01D 34/4165; A01D 42/00; B27B 17/0016; A01G 3/086; A01G 3/053
See application file for complete search history.

(56) References Cited

U.S. PATENT DOCUMENTS

| 5,013,282 A | 5/1991 | Keller |
| 5,603,173 A | 2/1997 | Brazell |
| (Continued) | | |

FOREIGN PATENT DOCUMENTS

| EP | 1075906 A2 | 2/2001 |
| EP | 2407021 A1 | 1/2012 |
| (Continued) | | |

OTHER PUBLICATIONS

Extended European Search Report for Application No. 17196532.0-1019, dated Jun. 14, 2018, 9 pages.

*Primary Examiner* — Hwei-Siu C Payer
(74) *Attorney, Agent, or Firm* — John Yun

(57) ABSTRACT

According to examples, a modular power tool may include a motor housing including an electric motor, a drive member connected to the electric motor, the drive member being connected to a drive coupler, an extension pole including an input shaft having a first end connector and a second end connector, in which the first end connector is configured to mate with the drive coupler, and an attachment component having an attachment connector and a working implement, in which the attachment component is configured to mate with either of the drive coupler and the second end connector.

18 Claims, 16 Drawing Sheets

(51) Int. Cl.
  *A01G 3/053*   (2006.01)
  *A01G 3/08*    (2006.01)
  *B27B 17/00*   (2006.01)

(56) References Cited

U.S. PATENT DOCUMENTS

| | | | |
|---|---|---|---|
| 5,809,653 | A | 9/1998 | Everts et al. |
| 6,474,747 | B2 | 11/2002 | Beaulieu et al. |
| 7,743,683 | B2 | 6/2010 | Dayton et al. |
| 8,020,304 | B2 * | 9/2011 | Mace .................. B27B 17/0008 30/296.1 |
| 8,136,254 | B2 | 3/2012 | Gieske et al. |
| 9,751,176 | B2 * | 9/2017 | McRoberts ............ B23Q 5/045 |
| 10,279,461 | B2 * | 5/2019 | Miaowu ................ A01G 3/053 |
| 2008/0141541 | A1 * | 6/2008 | Hurley ............... A01D 34/4163 30/276 |
| 2009/0183887 | A1 | 7/2009 | Baber et al. |
| 2010/0037469 | A1 | 2/2010 | Chubb |
| 2011/0306283 | A1 | 12/2011 | Kresge |
| 2012/0210585 | A1 * | 8/2012 | Gieske .................. A01G 3/086 30/296.1 |
| 2013/0324978 | A1 | 12/2013 | Nicholas et al. |
| 2014/0262388 | A1 | 9/2014 | Krause et al. |
| 2016/0227694 | A1 * | 8/2016 | Bermudez ............. A01G 3/086 |
| 2016/0311032 | A1 * | 10/2016 | Schenk ............. B23B 31/1071 |
| 2018/0084731 | A1 * | 3/2018 | Harris .................... A01G 3/086 |
| 2018/0104809 | A1 * | 4/2018 | Dyer ........................ B25F 3/00 |

FOREIGN PATENT DOCUMENTS

| | | | |
|---|---|---|---|
| EP | 2845691 | A1 | 3/2015 |
| EP | 3 348 357 | A1 * | 7/2018 |

* cited by examiner

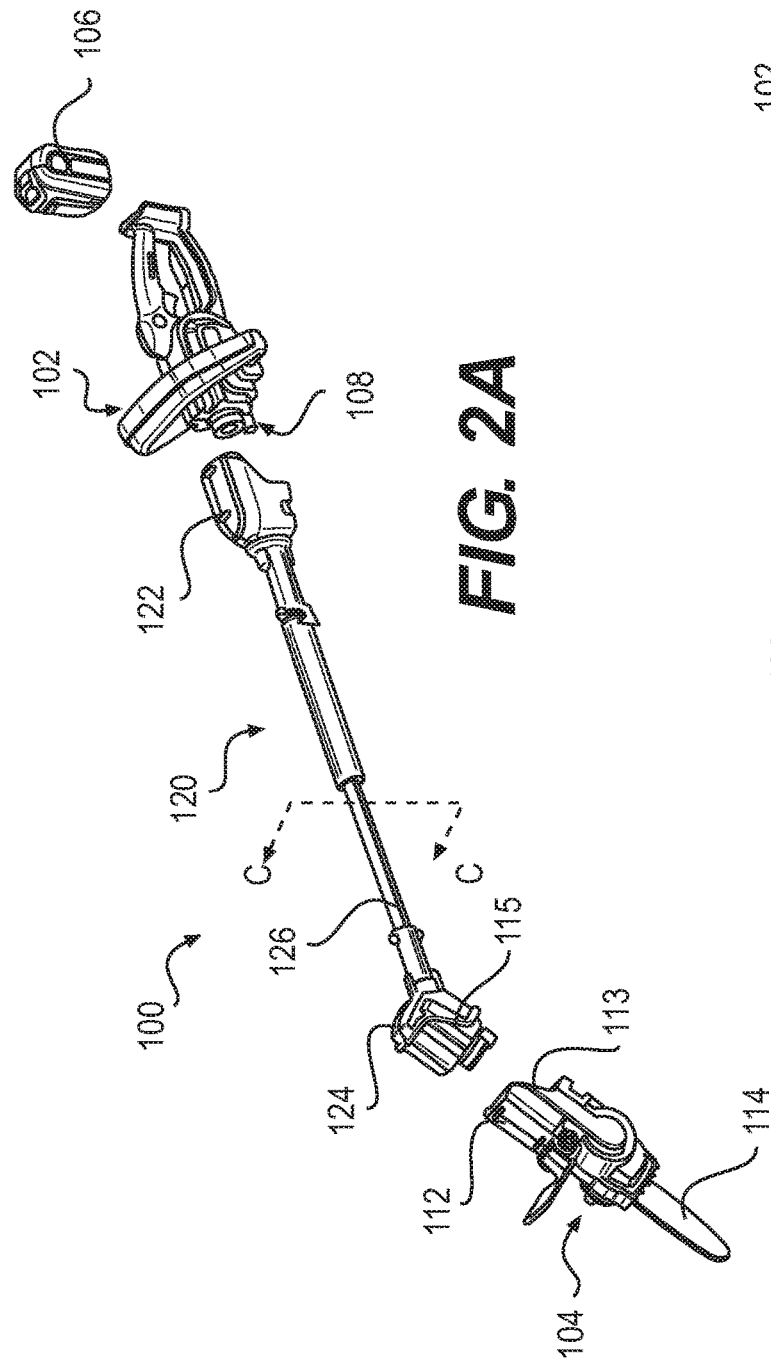
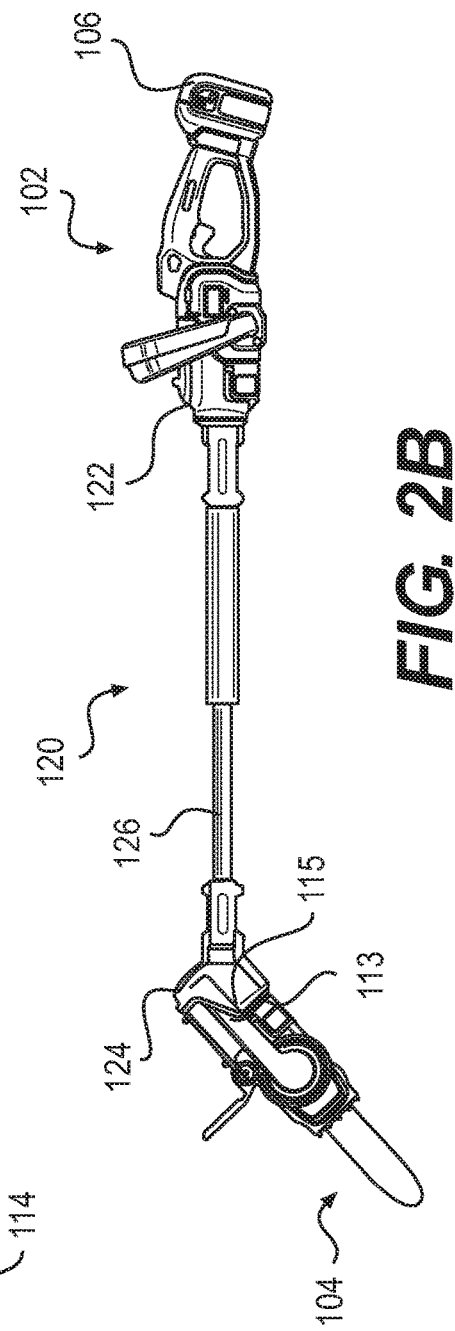

MODULAR POWER TOOL

CLAIM FOR PRIORITY

The present Application for Patent claims priority to U.S. Provisional Application No. 62/409,049 entitled "Modular Outdoor Tool System" filed on Oct. 17, 2016, the disclosure of which is hereby incorporated by reference in its entirety.

FIELD

The present disclosure relates to a modular power tool. In particular, the present disclosure relates to a modular power tool having a motor housing, an extension pole, and an attachment component, in which the motor housing houses an electric motor and the attachment component includes a working implement. The attachment component may be attached directly to the motor housing or the extension pole may be attached to the motor housing and the attachment component may be attached to the extension pole.

BACKGROUND

Power tools are implemented in a number of different tasks including those that are performed outdoors. These tasks include trimming branches, trimming hedges, and edging, to name a few. Power tools are typically designed and manufactured to perform one or just a few of these tasks. However, interchangeable handheld power tools have become increasingly popular. They allow users to purchase a single power head that can be used to power multiple different attachments, in which each attachment is configured to perform a particular task. The multiple different attachments include motors that are powered by the power head.

SUMMARY

This section provides a general summary of the disclosure, and is not a comprehensive disclosure of its full scope or all of its features.

According to embodiments disclosed herein, a modular power tool includes a motor housing including an electric motor and a drive member connected to the electric motor, in which the drive member is connected to a drive coupler. The modular power tool includes an extension pole including an input shaft having a first end connector and a second end connector, in which the first end connector is configured to mate with the drive coupler. The modular power tool also includes an attachment component having an attachment connector and a working implement, wherein the attachment component is configured to mate with either of the drive coupler and the second end connector.

According to embodiments disclosed herein, a modular power tool includes an attachment component having a connection member, an extension pole having a connection member, and a motor housing. The motor housing includes an electric motor, a drive member connected to the electric motor, a connection coupler having an opening, in which the drive member extends through the opening, and a locking ring configured to couple the connection member of either of the extension pole and the attachment component to the connection coupler when the locking ring is in an engaged position and to free the connection member from the connection coupler when the locking ring is in a disengaged position. In addition, the extension pole includes an extension pole locking ring configured to releasably couple the connection member of the attachment component to the extension pole.

According to embodiments disclosed herein, a modular power tool includes a motor housing having an electric motor, a drive member to be driven by the electric motor, in which the drive member is connected to a drive coupler, a locking ring having a plurality of locking pins, in which the locking ring is movable relative to the motor housing, and an extension pole. The extension pole includes an input shaft having a first end connector and a second end connector, in which the first end connector is to mate with the drive coupler. The modular power tool also includes a plurality of detents to releasably engage the plurality of locking pins, an extension pole locking ring having a plurality of locking pins, in which the locking pins are movable relative to the extension pole, and an attachment component. The attachment component has an attachment connector to releasably connect to one of the first end connector and the drive coupler and a plurality of detents to releasably engage either the plurality of locking pins of the motor housing and the plurality of locking pins of the extension pole locking ring.

BRIEF DESCRIPTION OF THE DRAWINGS

Features of the present disclosure are illustrated by way of example and not limited in the following figure(s), in which like numerals indicate like elements, in which:

FIGS. 2A-2D, respectively, show perspective views of modular power tools according to additional embodiments of the present disclosure;

DETAILED DESCRIPTION

Figure 1A:
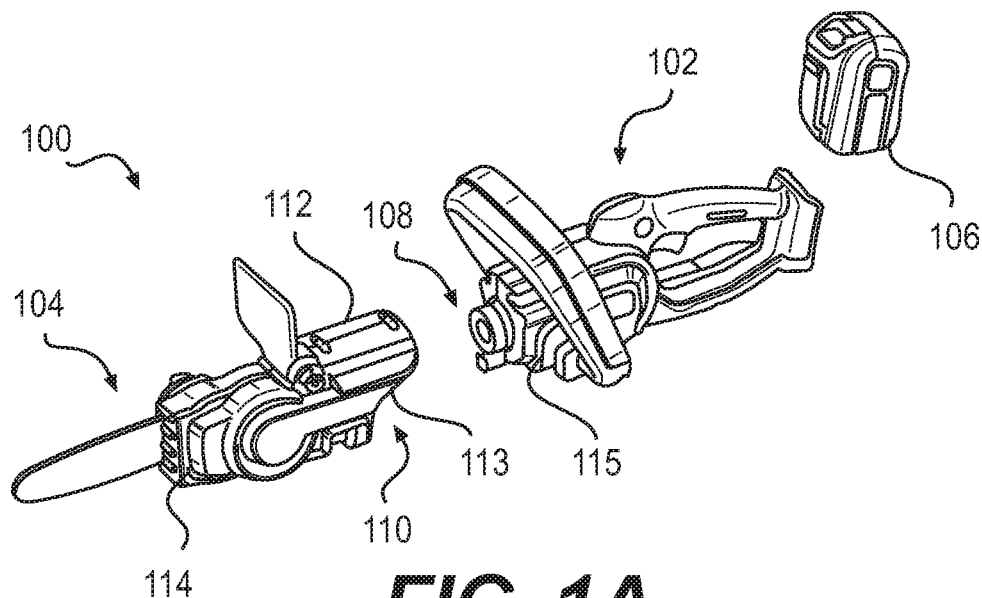
FIGS. 1A-1C, respectively, show perspective views of modular power tools according to embodiments of the present disclosure.

Disclosed herein are modular power tools that include a motor housing, an extension pole, and an attachment component. The attachment component may include any of multiple working implements, such as a chainsaw attachment, a hedge trimmer attachment, a string trimmer attachment, a blower attachment, or the like. The different types of attachment components may interchangeably be attached to the motor housing such that the same motor housing may be used to perform multiple types of tasks by attaching different ones of the attachment components to the motor housing. In addition, the extension pole may releasably be attached to the motor housing and the attachment component may be attached to the extension pole to increase the distance between the motor housing and the attachment component and thus the reach of the power tool.

The motor housing may be attached to either of the extension pole and the attachment component by a connection coupler and a locking ring in the motor housing and a connection member in the extension pole of the attachment component that is to engage the locking ring. The locking ring may include locking pins that engage detents in the connection member to hold the extension pole or the attachment component with respect to the motor housing. An electric motor in the motor housing drives a drive member that is mated to an input shaft in the extension pole or the attachment component. The drive member may be directly mated or may be mated via an output shaft to the input shaft, in which the output shaft extends through the connection coupler and the input shaft extends through the connection member. Additionally, the input shaft drives working components, e.g., a chainsaw blade, a hedge trimmer blade, a blower, etc., of a working implement. In this regard, the motor that drives the working components is located in the motor housing.

In conventional power tools having a power head with interchangeable attachments, the power heads supply power to the attachments and the attachments include electric motors that the power heads power. In contrast, the modular power tools disclosed herein include both the power source and the electric motor in the motor housing that is separate from the interchangeable attachments. As such, for instance, the interchangeable attachments in the present disclosure may be fabricated in a relatively simpler and less expensive manner as they may not require motors in the attachments.

In other conventional power tools that include motors in power heads, the power heads are attached to attachments through a split boom, e.g., a pole that is split near a middle of the pole. In these conventional power tools, the attachments are not attachable directly to the power heads, but instead, are required to be attached to the pole and thus, they do not provide a handheld tool option.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1B:
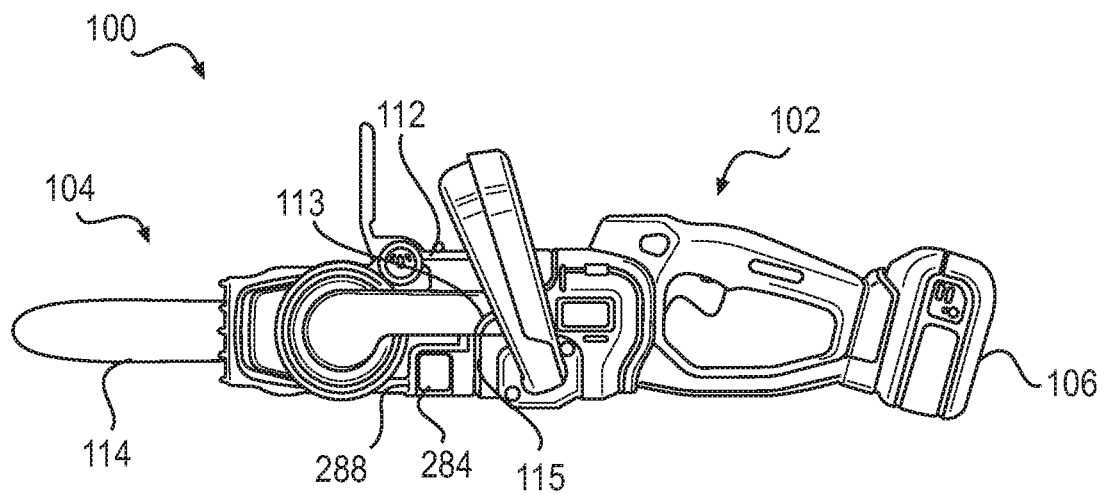
Figure 1C:
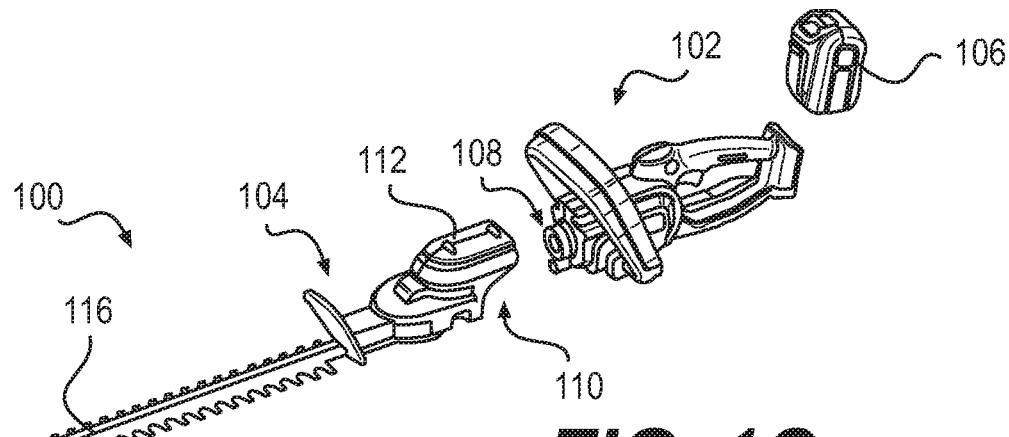

With reference first to FIGS. 1A-1C, there are respectively shown perspective views of modular power tools 100 according to embodiments of the present disclosure. It should be understood that the modular power tools 100 depicted in FIGS. 1A-1C may include additional components and that some of the components described herein may be removed and/or modified without departing from scopes of the power tools 100 disclosed herein.

As shown in those FIGS. 1A-1C, the modular power tool 100 is composed of a motor housing 102 and an attachment component 104. The modular power tool 100, which is also referenced herein as a power tool 100, may be powered by a battery 106. As discussed in greater detail herein, the battery 106 may releasably be attached to the motor housing 102 and may power an electric motor housed in the motor housing 102. Activation of the electric motor causes an output shaft in the motor housing 102 to rotate, which in turn, causes an input shaft in the attachment component 104 to which the output shaft is mated to rotate. The input shaft in the attachment component 104 may also be mated to a movable implement and rotation of the input shaft is to cause the movable implement to function.

As shown, the motor housing 102 includes a male portion 108 and the attachment component 104 includes a female portion 110. The male portion 108 is inserted into the female portion 110 to mate the attachment component 104 to the motor housing 102. As shown, the female portion 110 includes a sheath 112 that covers a portion of the male portion 108 to form an aesthetically pleasing look and feel, e.g., to make the motor housing 102 and the attachment component 104 appear as a unitary power tool housing when mated together. The sheath 112 is shown as having a mating surface 113 that is curved or non-planar and the motor housing 102 is also shown as having a mating surface 115 that is also curved similarly to the mating surface 113. In one regard, the mating surfaces 113, 115 may reduce or prevent torsional movement between the motor housing 102 and the attachment component 104.

Figure 10:
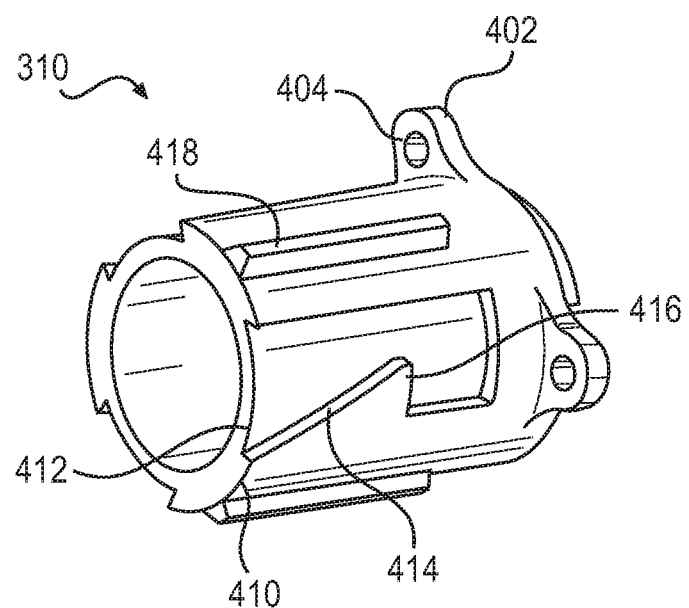
FIG. 10 shows a perspective view of a connection member according to an embodiment of the present disclosure.

As also shown, different types of attachment components 104 may be attached to the motor housing 102. By way of example, and as shown in FIGS. 1A and 1B, the attachment component 104 may be a chainsaw attachment 114. In another example, and as shown in FIG. 10, the attachment component 104 may be a hedge trimmer attachment 116. In other examples, the attachment component 104 may be other types of movable implements that the electric motor contained in the motor housing 102 may actuate or articulate. The other types of movable implements may include edgers, blowers, string trimmers, cultivators, etc. Accordingly, the power tools 100 disclosed herein may be implemented with any of a number of different types of tools.

Figure 2C:
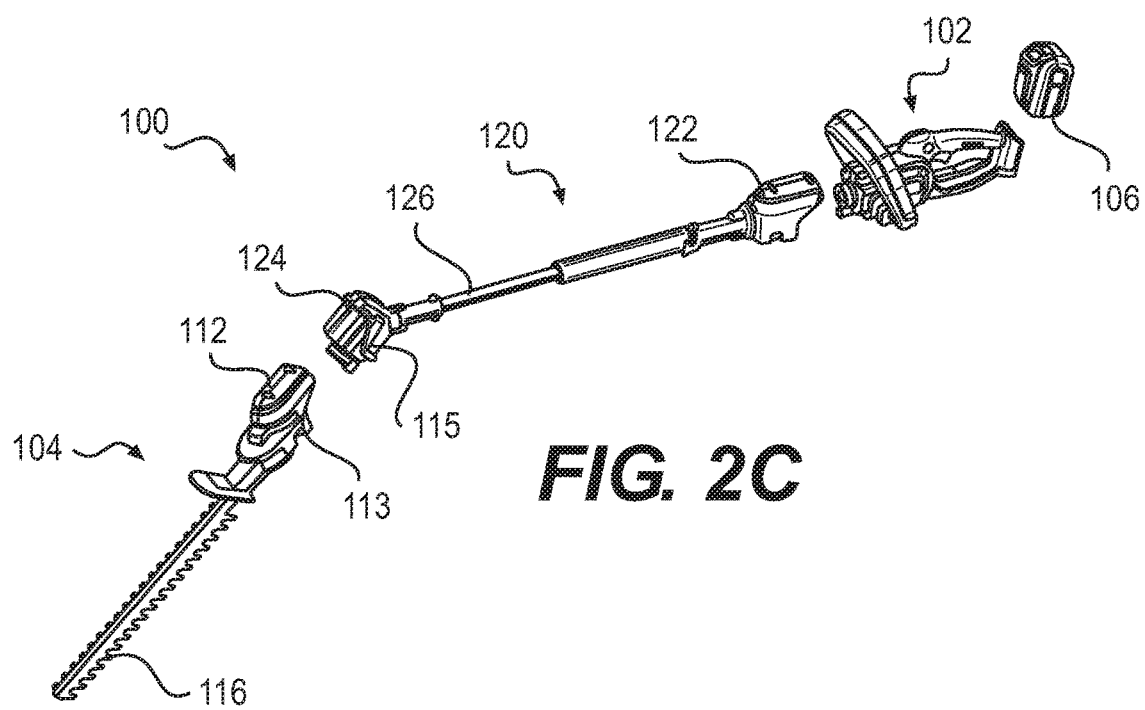
Figure 2D:
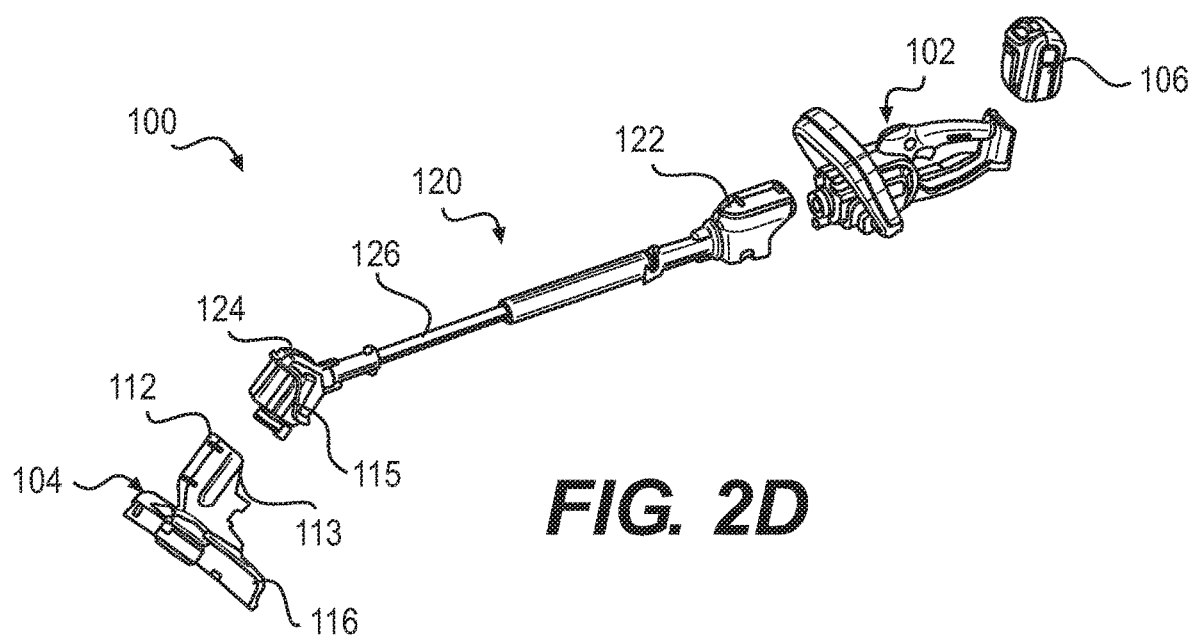

Turning now to FIGS. 2A-2D, there are respectively shown perspective views of the power tools 100 according to additional embodiments of the present disclosure. The power tools 100 depicted in FIGS. 2A-2C are similar to the power tools 100 depicted in FIGS. 1A-10, except that the attachment components 104 depicted in FIGS. 2A-2C are connected to extension poles 120. The extension poles 120 include a female section 122, a male section 124, and a hollow bar 126 that connects the female section 122 to the male section 124. The female section 122 is to mate with the motor housing 102 and the male section 124 is to mate with an attachment component 104. As shown, the attachment component 104 is a chainsaw attachment 114 or a hedge trimmer attachment 116. However, the attachment component 104 may include other types of working implements, such as a string trimmer 128 as shown in FIG. 2D, a blower, etc.

As shown, the female section 122 is to receive the male portion 108 of the motor housing 102 such that the female section 122 may be attached to the motor housing 102. The female section 122 may have a similar or same configuration as the female portion 110 of the attachment component 104. The female section 122 mates with the male portion 108 in a similar or same manner as the female portion 110 of the attachment component 104. In addition, the male section 124 may be inserted into the female portion 110 of the attachment component 104. The male section 124 may have a similar or same configuration to the male section 108 of the motor housing 102. In this regard, the attachment component 104 may be attached directly to the motor housing 102 or to the extension pole 120 using the same types of connections. In addition, the male section 124 is depicted as having a similar curved mating surface 115 as the male portion 108. As such, when the attachment component 104 is attached to the male section 124 as shown in FIG. 2C, the mating surfaces 113, 115 may abut each other to provide the appearance of a unitary housing while providing resistance against relative torsional movement with respect to each other.

Figure 3:
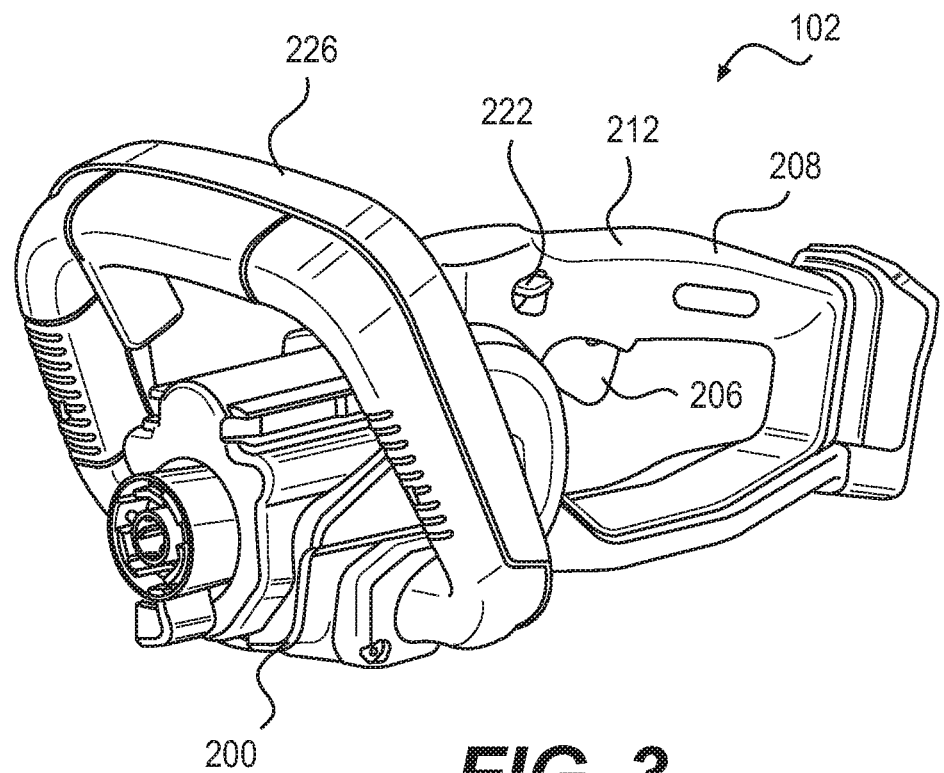
FIGS. 3 and 4, respectively, show perspective views of the motor housing depicted in FIGS. 1A-1C and 2A-2C.
Figure 4:
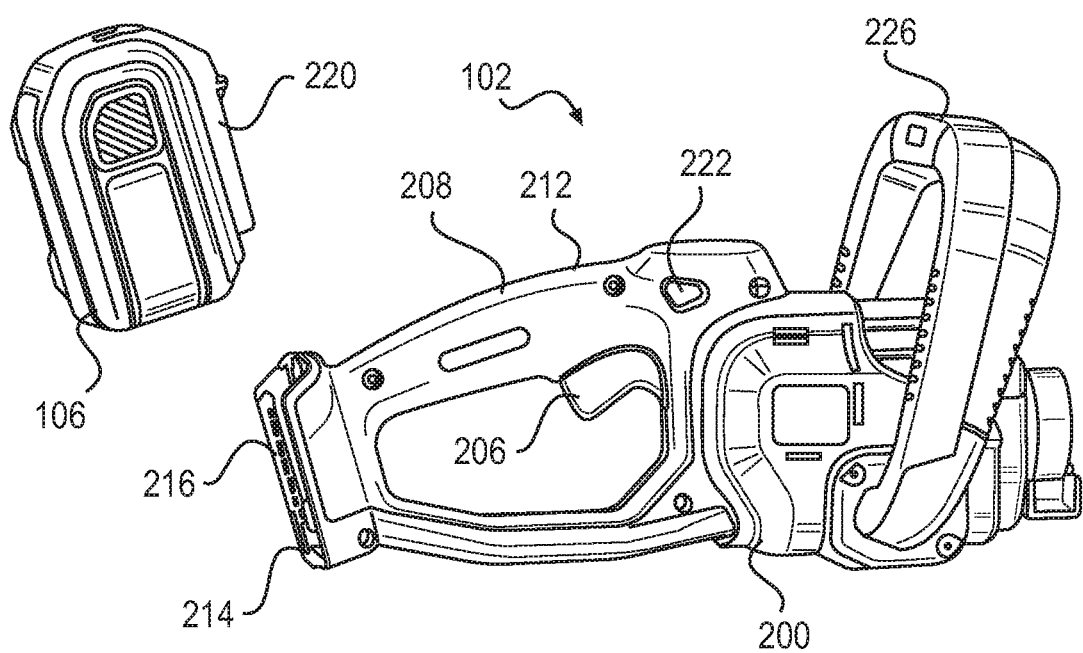
Figure 5:
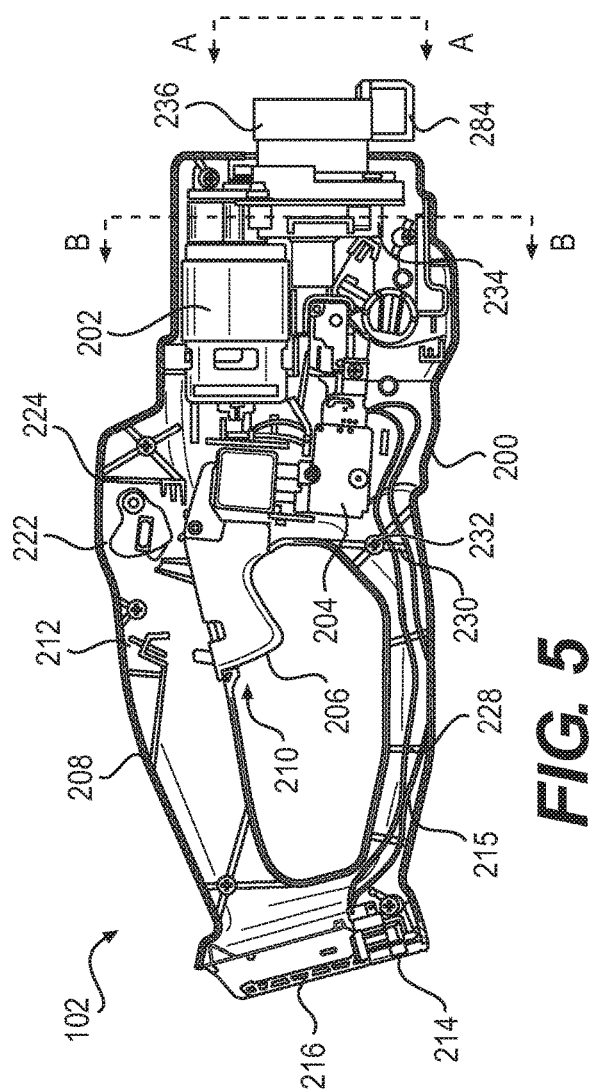
FIG. 5 shows a cross-sectional perspective view of the motor housing depicted in FIGS. 3 and 4 according to an embodiment of the present disclosure.

Reference is now made to FIGS. 3-5. FIGS. 3 and 4 respectively show perspective views of the motor housing 102 depicted in FIGS. 1A-1C and 2A-2D according to an embodiment. FIG. 5 shows a cross-sectional side view of the motor housing 102 according to an embodiment. It should be understood that the motor housing 102 depicted in FIGS. 3-5 may include additional components and that some of the components described herein may be removed and/or modified without departing from a scope of the motor housing 102 disclosed herein.

The motor housing 102 is depicted as including a casing 200 that includes an electric motor 202 and a motor switch 204 that is to operate the electric motor 202. A trigger mechanism 206 is depicted as being mounted relative to the casing 200 and is movable to selectively activate the motor switch 204 and operate the electric motor 202. The trigger mechanism 206 is depicted as being pivotally mounted to a handle 208 of the casing 200, which may be integrally formed with the casing 200. Particularly, the trigger mechanism 206 is depicted as being positioned within a recess 210 formed in the handle 208. A user may, while holding the handle 208, press the trigger mechanism 206 to cause the motor switch 204 to apply electrical energy to the electric motor 202, which causes the electric motor 202 to rotate. The handle 208 may be provided with a grip attachment 212 that is formed of a material that may improve a user's grip on the handle 208. The grip attachment 212 may be formed of rubber, plastic, foam, leather, or the like.

A battery 106 may supply electrical energy to the electric motor 202 through an electrical interface 214. As shown, the motor housing 102 includes a slot 216 into which the battery 106 may be removably mounted to the casing 200. The battery 106 may be removably mounted to the housing 102 through any suitable mounting mechanism. For instance, the battery 106 may include rails 220 that may enter into sliding engagement with walls of the slot 216 as shown in FIG. 4. The mounting mechanism may include a latching mechanism that engages the battery 106 to securely mount the battery 106 to the casing 200, in which the latching component may be disengaged. According to examples, the battery 106 is a rechargeable battery. In other examples, in addition to or other than the battery 106, an electrical cord may be attached to the electrical interface 214 such that the power tool 100 may be powered through receipt of electrical energy from a power outlet. In any of these examples, electrical energy may be supplied from the electrical interface 214 to the motor switch 204 and the electric motor 202 through wires 215 running inside the casing 200.

According to examples, a lock button 222 is positioned with respect to the trigger mechanism 206 to prevent the trigger mechanism 206 from being depressed when the lock button 222 is in a locking position, e.g., in a direction toward the top of the casing 200. The lock button 222 may be biased to remain in the locking position by a spring 224. In these examples, the lock button 222 may be required to be depressed to enable the trigger mechanism 206 to be depressed, for instance, as a safety mechanism to prevent unintentional activation of the electric motor 202. As shown in FIGS. 3-5, the lock button 222 is positioned near the trigger mechanism 206 to enable a user to press both the lock button 222 and the trigger mechanism 206 simultaneously with one hand. In addition, the lock button 222 may be manipulated from both sides of the handle 208 to enable the lock button 222 to be depressed with either of a user's thumbs.

As also shown in FIGS. 3 and 4, the motor housing 102 includes an auxiliary handle 226 mounted to the casing 200. For instance, the auxiliary handle 226 may be attached to the casing 200 through a number of mechanical fasteners. During use of the power tool 100, a user may grasp the handle 208 with one hand and may grasp the auxiliary handle 226 with the other hand to securely maneuver the power tool 100.

The casing 200 may be formed of two halves, in which each of the halves may be formed through any suitable fabrication process such as injection molding, casting, 3D printing, etc. As shown in FIG. 5, each of the halves may also be formed of a plastic material and may include reinforcement features 228 that are to increase the rigidity of the motor housing 102. Each of the halves may also include attachment features 230 that enable the halves to be fastened to each other through use of mechanical fasteners 232.

Figure 6:
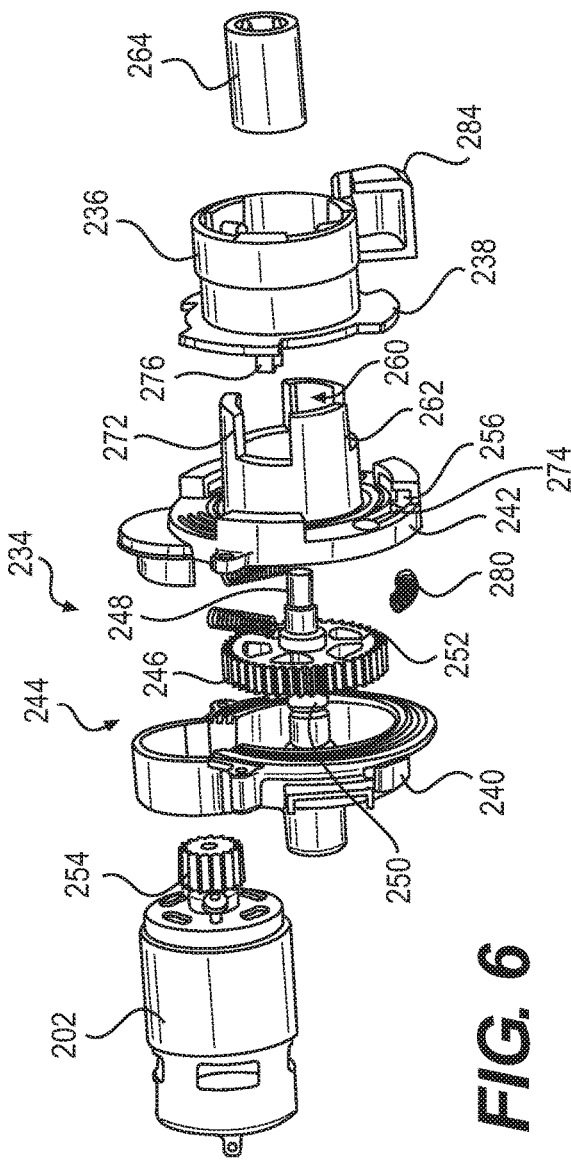
FIG. 6 depicts an exploded perspective view of portions of the motor housing depicted in FIG. 5 according to an embodiment of the present disclosure.

The motor housing 102 is also depicted as including a connection coupler 234 and a locking ring 236. The connection coupler 234 and the locking ring 236 are described in greater detail with respect to FIGS. 6, 7A, and 7B. FIG. 6 depicts an exploded perspective view of portions of the motor housing 102, FIG. 7A depicts a front view of the connection coupler 234 and the locking ring 236 taken along lines A-A in FIG. 5, and FIG. 7B depicts a cross-sectional view of the connection coupler 234 and the locking ring 236 taken along lines B-B in FIG. 5, according to an embodiment.

As shown in FIG. 6, the connection coupler 234 includes a first casing portion 240 and a second casing portion 242, which together may form a gearcase. Generally speaking, the features shown in FIG. 6 may be construed as a transmission of the modular power tool 100. The first casing portion 240 is connected to the second casing portion 242 to form a chamber 244 that houses a drive gear 246 having an output shaft 248. The drive gear 246 is mounted to the first casing portion 240 and the second casing portion 242 via bearings 250, 252 to enable the drive gear 246 to be rotated freely. The output shaft 248 is fixedly connected to the drive gear 246 such that the output shaft 248 rotates concurrently with the drive gear 246.

The drive gear 246 is depicted as including a plurality of teeth that mate with teeth on a drive member 254 of the electric motor 202. In operation, when the electric motor 202 is activated, the electric motor 202 causes the drive member 254 to rotate. Rotation of the drive member 254 causes the drive gear 246 and the output shaft 248 to rotate. The output shaft 248 extends into an opening 260 in a coupling protrusion 262 of the second casing portion 242. A drive coupler 264 is also depicted as being inserted into the opening 260 and is to be coupled to a drive pinion 312 (FIG. 8C) that is coupled to the output shaft 248. As discussed in greater detail herein, the drive pinion 312 is also to be coupled to an input shaft 314 of an attachment component 104. In this regard, the drive coupler 264 and the drive pinion 312 are to cause the input shaft 314 of the attachment component 104 to rotate with the rotation of the output shaft 248.

Figure 7A:
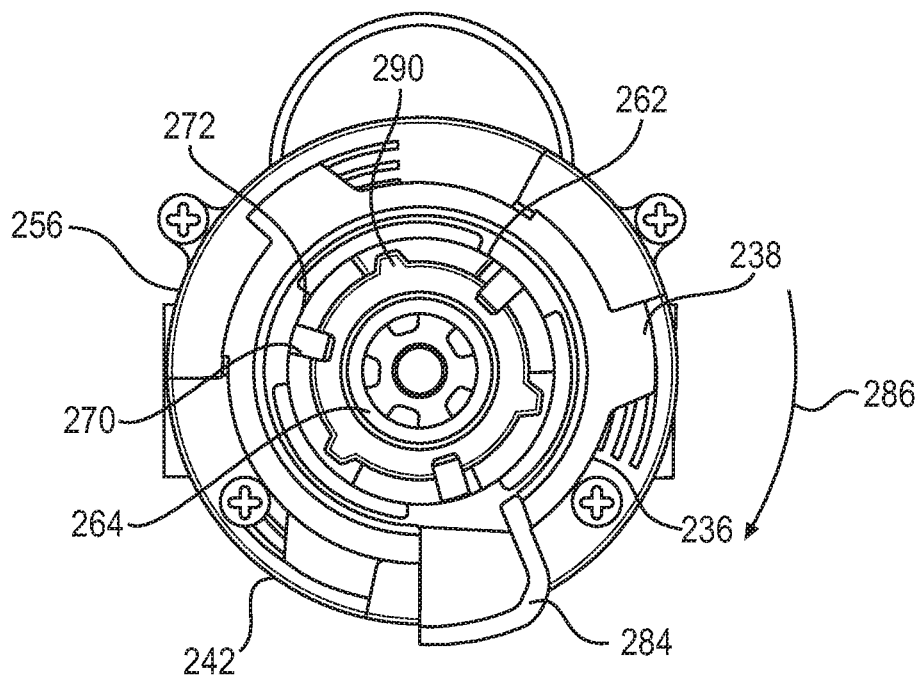
FIG. 7A depicts a front view of the connection coupler and the locking ring taken along lines A-A in FIG. 5 according to an embodiment of the present disclosure.
Figure 7B:
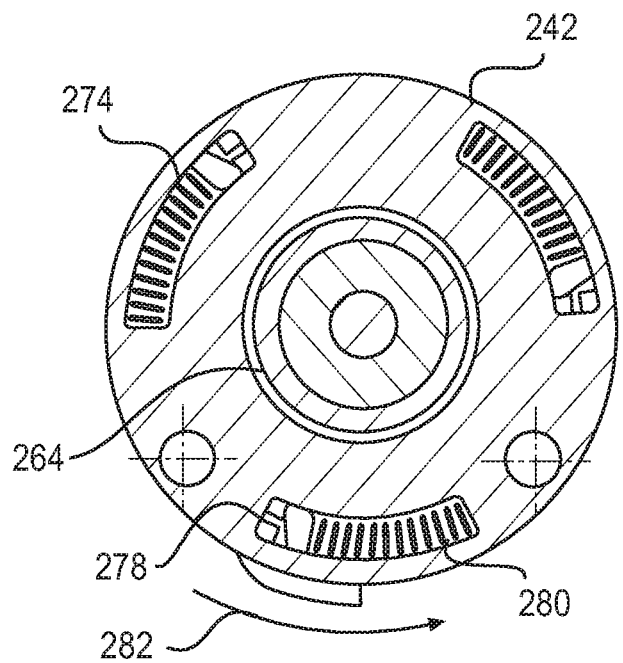
FIG. 7B depicts a cross-sectional view of the connection coupler and the locking ring taken along lines B-B in FIG. 5 according to an embodiment of the present disclosure.

As shown in FIGS. 6 and 7A, the locking ring 236 includes a plurality of locking pins 270 that extend into an interior of the locking ring 236. The locking pins 270 may also extend through notches 272 formed in the coupling protrusion 262. The locking pins 270 may be formed of a metallic material such as stainless steel, high carbon steel, etc., a metallic alloy, a plastic, or the like. In any regard, the locking pins 270 may be securely and firmly mounted to the locking ring 236. For instance, the locking ring 236 may be formed of a plastic material and the locking ring 236 may be molded around the locking pins 270. The locking ring 236 also includes flanges 238 that are inserted within support sections 256 that enable the locking ring 236 to rotate with respect to the second casing portion 242 while preventing the locking ring 236 from separating from the second casing portion 242.

As shown in FIGS. 6 and 7B, the second casing portion 242 may include slots 274 and the locking ring 236 may include posts 276 that are inserted into the slots 274. The posts 276 may be held within and may be movable within the slots 274 to enable relative rotational movement of the locking ring 236 with respect to the second casing portion 242. Additionally, spring posts 278 and springs 280 may be provided in the slots 274, in which the spring posts 278 may provide a connection for the springs 280 on the second casing portion 242. The springs 280 may bias the posts 276 of the locking ring 236 in the direction denoted by the arrow 282. As shown in FIG. 7A, the locking ring 236 may include a lever 284 that may be pressed in the direction denoted by the arrow 286. As discussed in greater detail herein, the lever 284 may be depressed in the direction denoted by the arrow 286 to disengage detents of an attachment component 104 from the locking pins 270. That is, the lever 284 may be depressed to separate the attachment component 104 from the motor housing 102.

Figure 8A:
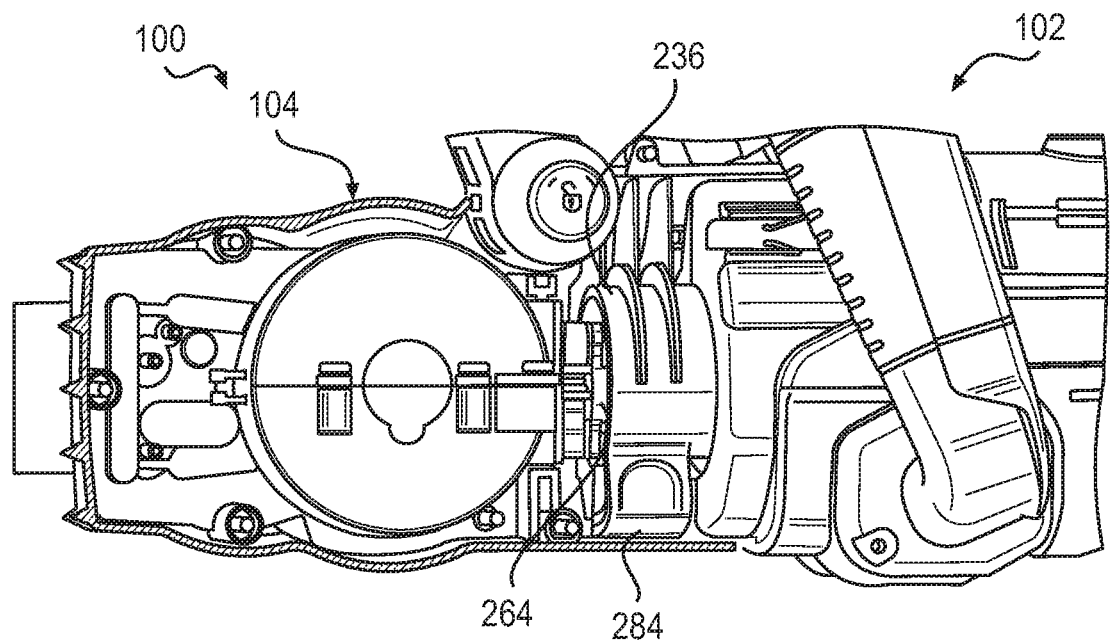
FIG. 8A depicts a partial cross-sectional side view of a portion of power tool with an attachment component attached to a motor housing according to an embodiment of the present disclosure.
Figure 8B:
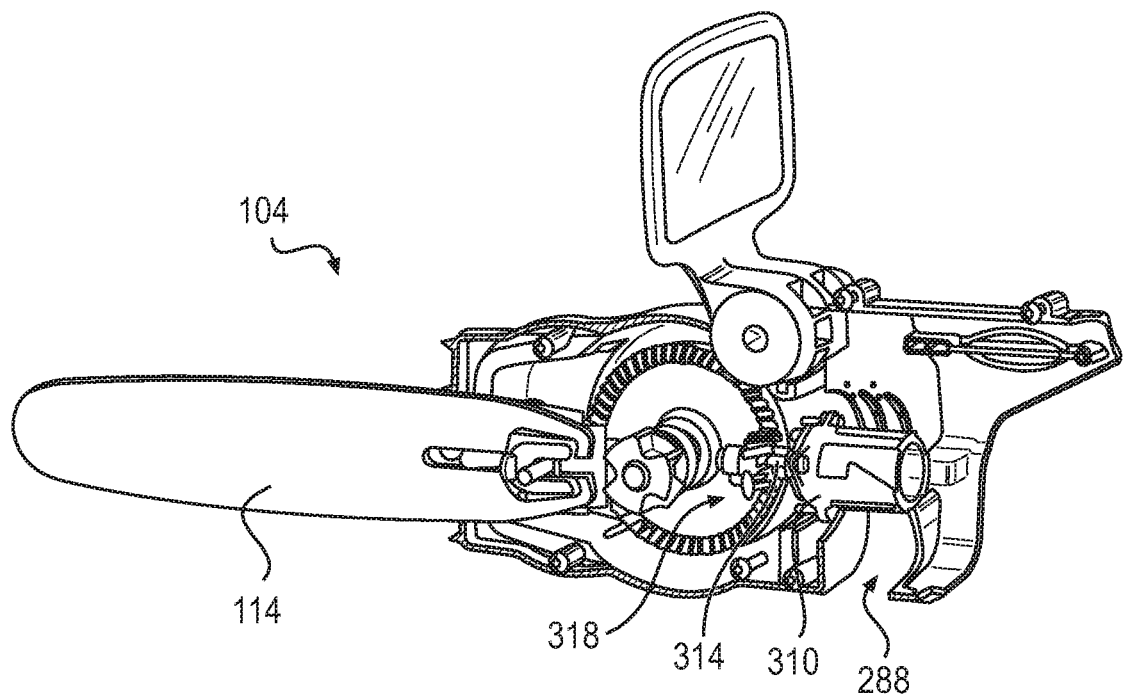
FIG. 8B depicts a further cross-sectional view of the power tool depicted in FIG. 8A according to an embodiment of the present disclosure.
Figure 8C:
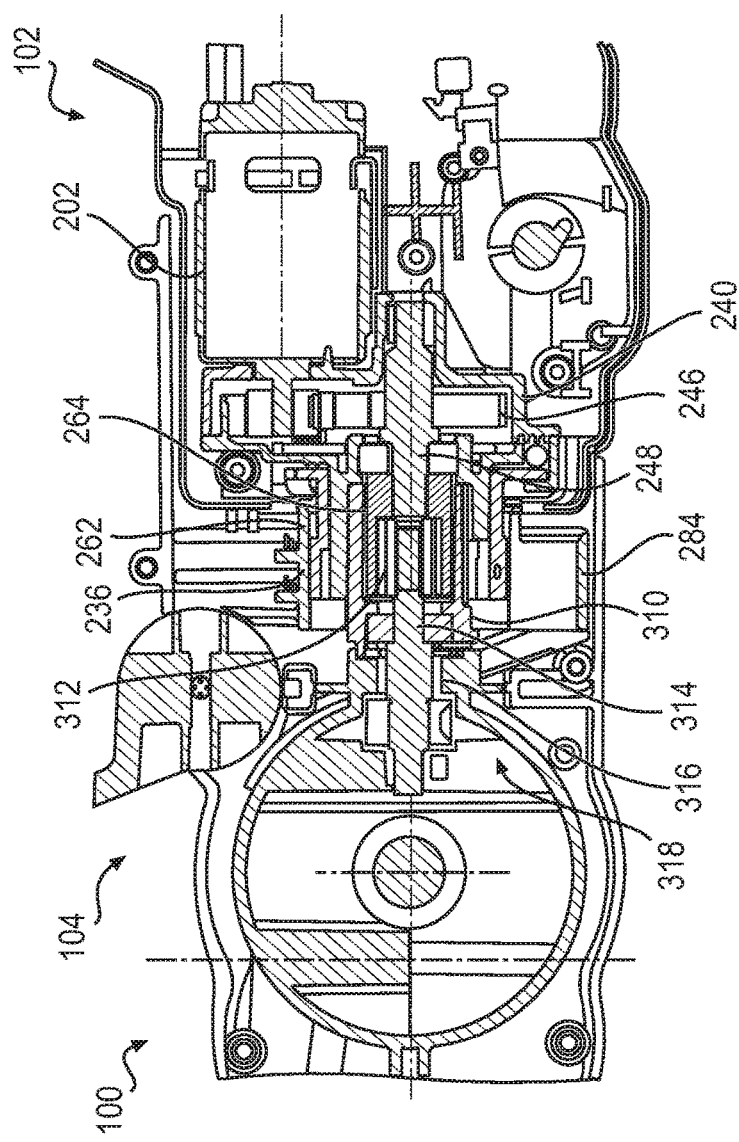
FIG. 8C depicts a further cross-sectional view of the power tool depicted in FIG. 8A according to an embodiment of the present disclosure.

With reference back to FIG. 1B, the attachment component 104 is depicted as including an opening 288 through which the lever 284 is accessible. Thus, for instance, to disengage the attachment component 104 from the motor housing 102, a user may depress the lever 284 to thus cause the locking ring 236 to rotate and release detents in the attachment component 104. Various manners in which the attachment component 104 may be engaged with the motor housing 102 are described in greater detail with respect to FIGS. 8A-8C. FIG. 8A depicts a partial cross-sectional side view of a portion of the power tool 100 with an attachment component 104 attached to the motor housing 102. FIG. 8B depicts a cross-sectional perspective view of the attachment component 104 depicted in FIG. 8A. FIG. 8C depicts a further cross-sectional view of the power tool 100 depicted in FIG. 8A.

As shown in FIGS. 8A-8C, the attachment component 104 may be attached to the motor housing 102. That is, the attachment component 104 includes a fixedly attached connection member 310 that is inserted into the coupling protrusion 262 of the second casing portion 242 of the motor housing 102. FIG. 8B also depicts the opening 288 for the lever 284 of the locking ring 236. Additionally, as shown in FIG. 8C, the drive pinion 312 is inserted within and is coupled to the drive coupler 264 and the drive pinion 312 couples the output shaft 248 to an input shaft 314 of the attachment component 104. A bearing 316 may retain the input shaft 314 such that the input shaft 314 rotates with the output shaft 248. In the example shown in FIG. 8C in which the attachment component 104 is a chainsaw attachment 114, the input shaft 314 is attached to a gearing system 318 that causes a chainsaw blade to be rotated as the input shaft 314 is rotated. In other examples in which the attachment component 104 includes another type of working implement, the input shaft 314 may be attached to other components to cause the working implements to actuate, rotate, or the like.

Figure 9:
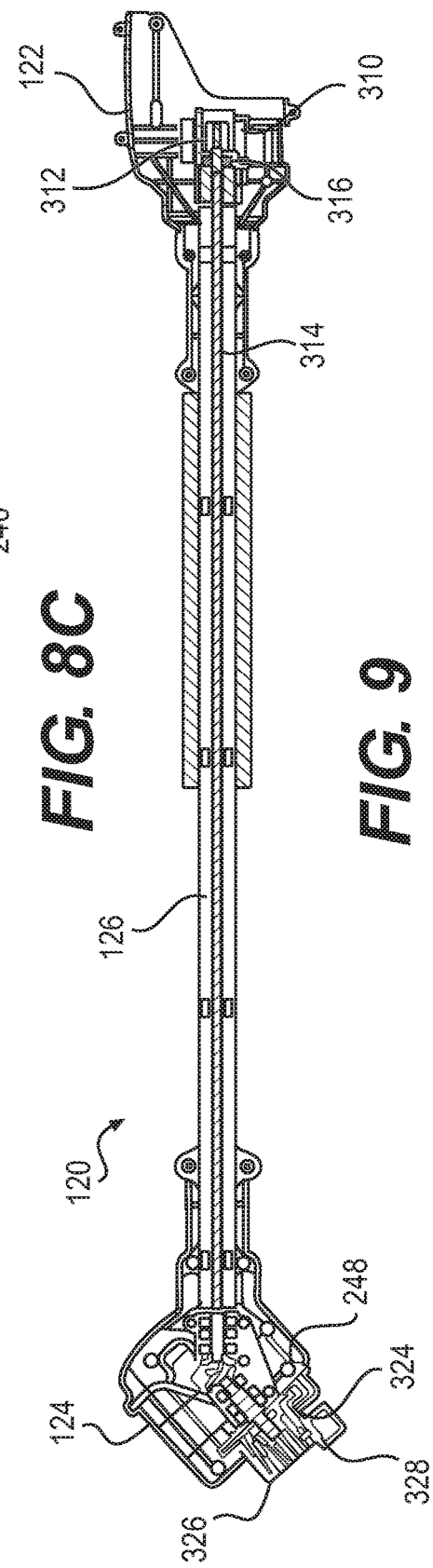
FIG. 9 shows a cross-sectional view of the extension pole taken along lines C-C in FIG. 2A according to an embodiment of the present disclosure.

In other examples, and as discussed above with respect to FIGS. 2A-2C, the attachment component 104 may be attached to an extension pole 120 that is attached to the motor housing 102. In these examples, and as shown in FIG. 9, the extension pole 120 includes features that are similar to or the same as the features of the attachment component 104 shown in FIG. 8C and the motor housing 102. Particularly, FIG. 9, which is a cross-sectional view of the extension pole 120 taken along lines C-C in FIG. 2A, shows that the female section 122 includes a connection member 310, a drive pinion 312, an input shaft 314, and a bearing 316. The input shaft 314 also runs through the hollow bar 126 from the female section 122 to the male section 124. The input shaft 314 terminates at the male section 124 and is connected to an output shaft 248.

As shown, the male section 124 may have similar features to the male portion 108 in the motor housing 102. For instance, and as shown in FIG. 9, the male portion 124 includes a drive coupler 324, a locking ring 326, and locking pins 328. In addition, an attachment component 104 includes the female portion 110 as discussed above and may be attached to the male section 124 in manners similar to those discussed herein with respect to the attachment component 104 and the motor housing 102. Accordingly, the motor housing 102 is able to mate with the extension pole 120 or an attachment component 104 through the same connection arrangement. Likewise, the attachment component 104 is able to mate with the motor housing 102 or the extension pole 120 through the same connection arrangement.

Reference is now made to FIG. 10, which shows a perspective view of a connection member 310 of an attachment component 104 or an extension pole 120. As shown, the connection member 310 includes a base portion 402 that includes holes 404 through which fasteners (not shown) may be inserted to securely attach the connection member 310 to an attachment component 104 or an extension pole 120.

The connection member 310 is also depicted as including a plurality of protrusions 410 extending above an outer surface 412 of the connection member 310. The protrusions 410 each have a ramp 414 and a detent 416, which are used with the locking pins 270 of the locking ring 236 to lock the attachment component 104 or the extension pole 120 to the motor housing 102 as discussed in greater detail below with respect to FIGS. 11A-11C. The connection member 310 is further depicted as including key elements 418 extending above the outer surface 412 of the connection member 310. For instance, the key elements 418 may extend from the plurality of protrusions 410. In any regard, the key elements 418 may be inserted into corresponding slots 290 (FIG. 7A) in the second casing portion 242 to prevent the attachment component 104 or the extension pole 120 from rotating with respect to the motor housing 102.

Figure 11A:
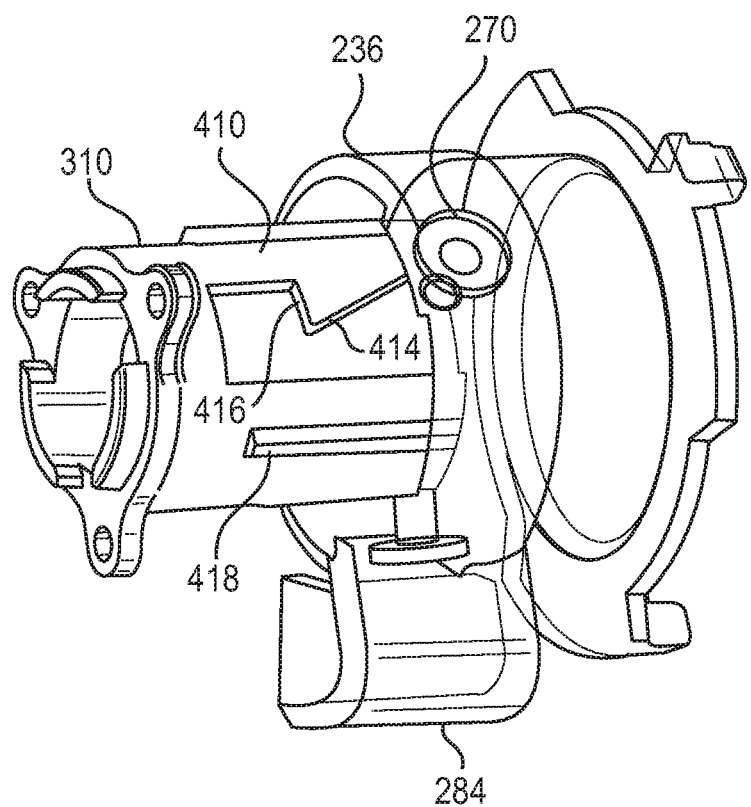
FIGS. 11A-11C show perspective views of the connection member being inserted into and engaging a locking ring during three stages of interaction according to an embodiment of the present disclosure.
Figure 11B:
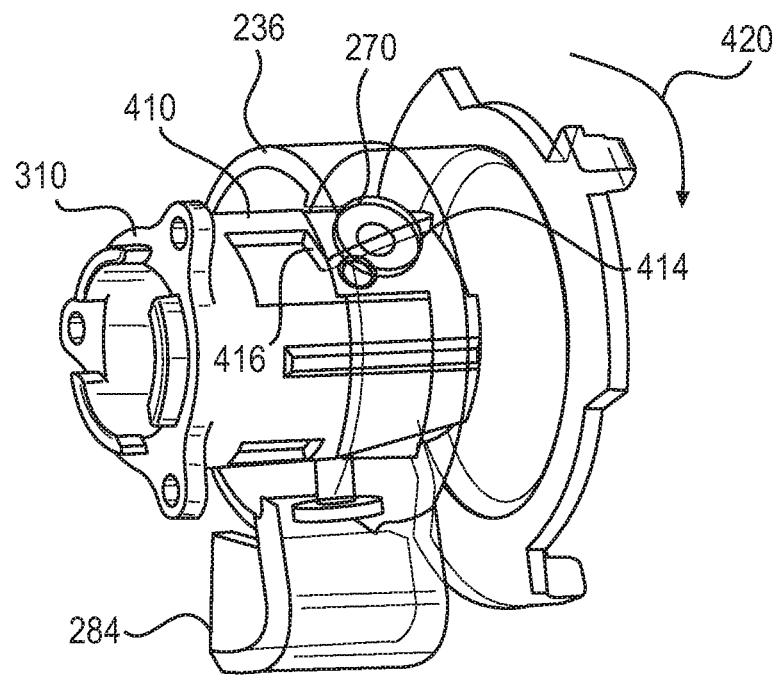
Figure 11C:
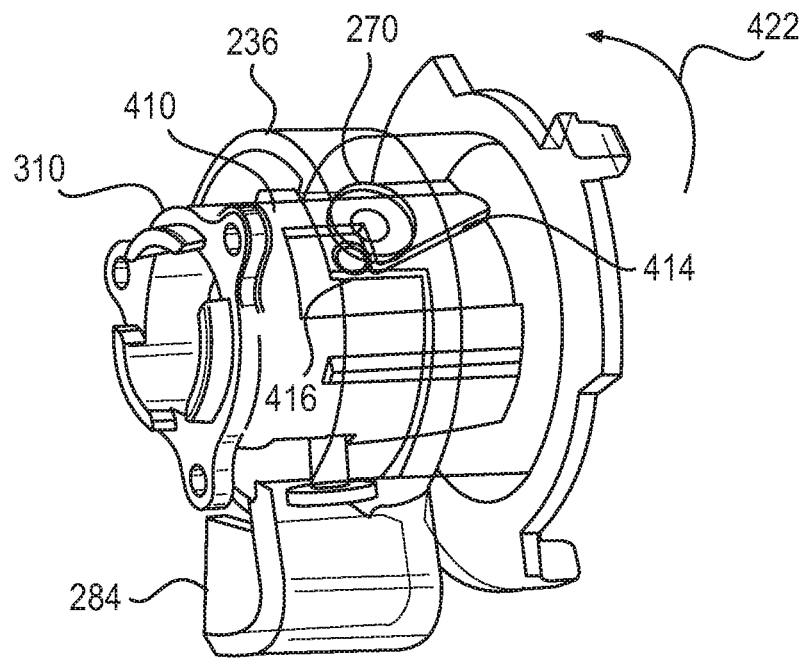

With reference now to FIGS. 11A-11C, there are shown perspective views of the connection member 310 being inserted into and engaging a locking ring 236 during three stages of interaction. FIG. 11A shows a stage immediately prior to the connection member 310 being inserted into the locking ring 236. As shown, an end of the ramp 414 of the protrusion 410 is aligned with a locking pin 270 of the locking ring 236. FIG. 11B shows a stage during partial insertion of the connection member 310 into the locking ring 236. The locking pin 270 slides over the ramp 414 causing the locking ring 236 to rotate in the direction denoted by the arrow 420. As discussed above with respect to FIGS. 6 and 7B, the locking ring 236 includes posts 276 that are inserted into slots 274 in the second casing portion 242 and the posts 276 are attached to springs 280. As also discussed above, the springs 280 normally bias the posts 276 in a direction counter to the direction denoted by the arrow 420.

FIG. 11C shows a stage following full insertion of the connection member 310 into the locking ring 236 in which the locking ring 236 is in an engaged position. As shown, the locking pin 270 rests adjacent to the detent 416 when the connection member 310 is fully inserted into the locking ring 236. Particularly, once the locking pin 270 has cleared the ramp 414, the spring 280 causes the locking ring 270 to rotate in the direction denoted by the arrow 422 causing the locking pin 270 to be held next to the detent 416. In this regard, engagement of the locking pin 270 and the detent 416 prevents the connection member 310 from disengaging from the locking ring 236. As the locking ring 236 is rotatably mounted to the connection coupler 234, which is mounted to the motor housing 102, engagement between the connection member 310 and the locking ring 236 results in the attachment component 104 being attached to the motor housing 102. In other examples, the engagement results in the attachment component 104 being securely attached to the motor housing 102 or the extension pole 120.

As discussed herein, insertion of the attachment component 104 or the extension pole 120 results in the lever 284 of the locking ring 236 to extend through an opening 288. To release the connection member 310 from the locking ring 236, the lever 284 may be rotated, which causes the locking ring 236 to rotate in the direction denoted by the arrow 420 in FIG. 11B. When the locking ring 236 has rotated a sufficient distance to cause the locking pin 270 to clear the detent 416, in which the locking ring 236 is in a disengaged position, the connection member 310 may be pulled in a direction away from the locking ring 236 without the locking pin 270 blocking movement of the connection member 410 away from the locking ring 236. In this respect, the attachment component 104 or the extension pole 120 may be disengaged from the motor housing 102 by pulling the attachment component 104 or the extension pole 120 away from the motor housing 102 while the lever 284 is pressed.

Figure 12A:
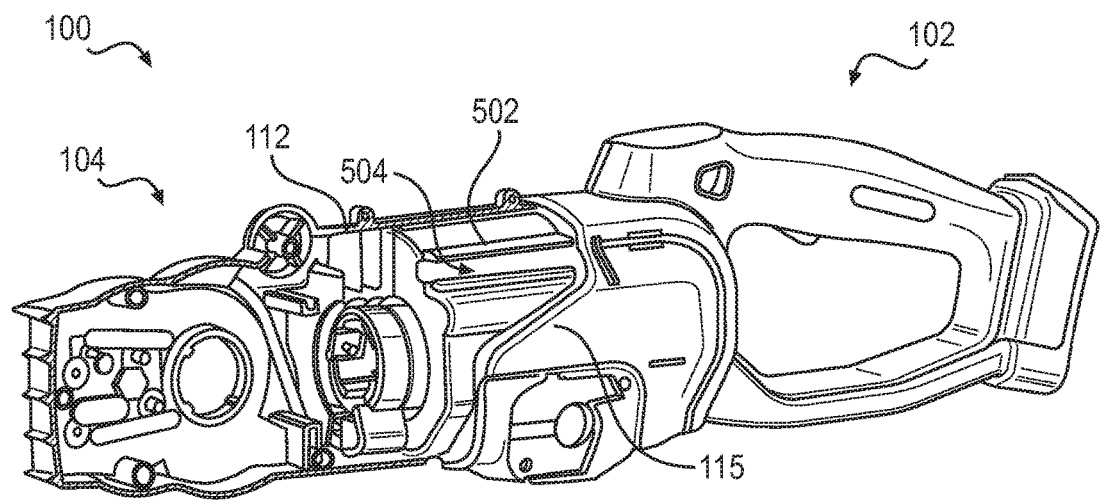
FIGS. 12A and 12B, respectively, show perspective views of a power tool with parts of the attachment component and the motor housing removed according to an embodiment of the present disclosure.
Figure 12B:
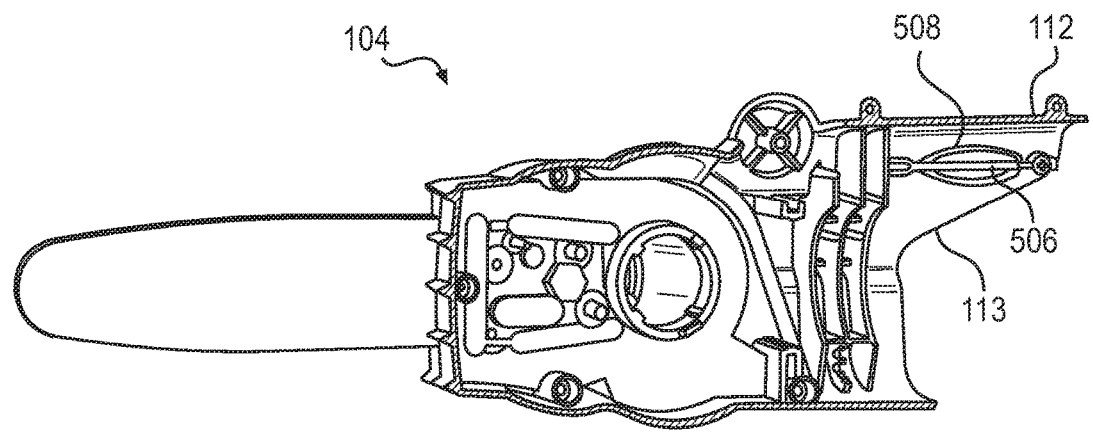

Turning now FIGS. 12A and 12B, there are respectively shown perspective views of a power tool 100 with parts of the attachment component 104 and the motor housing 102 removed according to an embodiment of the present disclosure. The power tool 100 may include a motor housing 102 and an attachment component 104 (and/or an extension pole 120) as discussed above. As shown in FIG. 12, the motor housing 102 may include a housing rail 502 that forms a groove 504 on an external portion of the motor housing 102. Although not visible in FIG. 12A, a similar housing rail 502 and a similar groove 504 are also formed on the opposite side of the motor housing 102.

In addition, as shown in FIG. 12B, the attachment component 104 (and/or the extension pole 120) may include support rails 506 that are to be inserted into the grooves 504 formed by the housing rails 502 when the attachment component 104 (or the extension pole 120) is attached to the motor housing 102. Engagement between the support rails 506 in the attachment component 104 (or the extension pole 120) and the housing rails 502 on the motor housing 102 may provide additional support against relative rotational or torsional movement between the attachment component 104 (or the extension pole 120) and the motor housing 102. Additionally, spring elements 508 may be provided on the support rails to enhance the support. The housing rails 502 and the grooves 504 may also be formed on the male section 124 of the extension pole 120 and the support rails 506 on the attachment component 104 may be inserted into the grooves 504 of the extension pole 120. Moreover, the mating surfaces 113, 115 respectively on the attachment component 104, the extension pole 120, and the motor housing 102 may provide further support against relative rotational or torsional movement between these components.

Figure 13A:
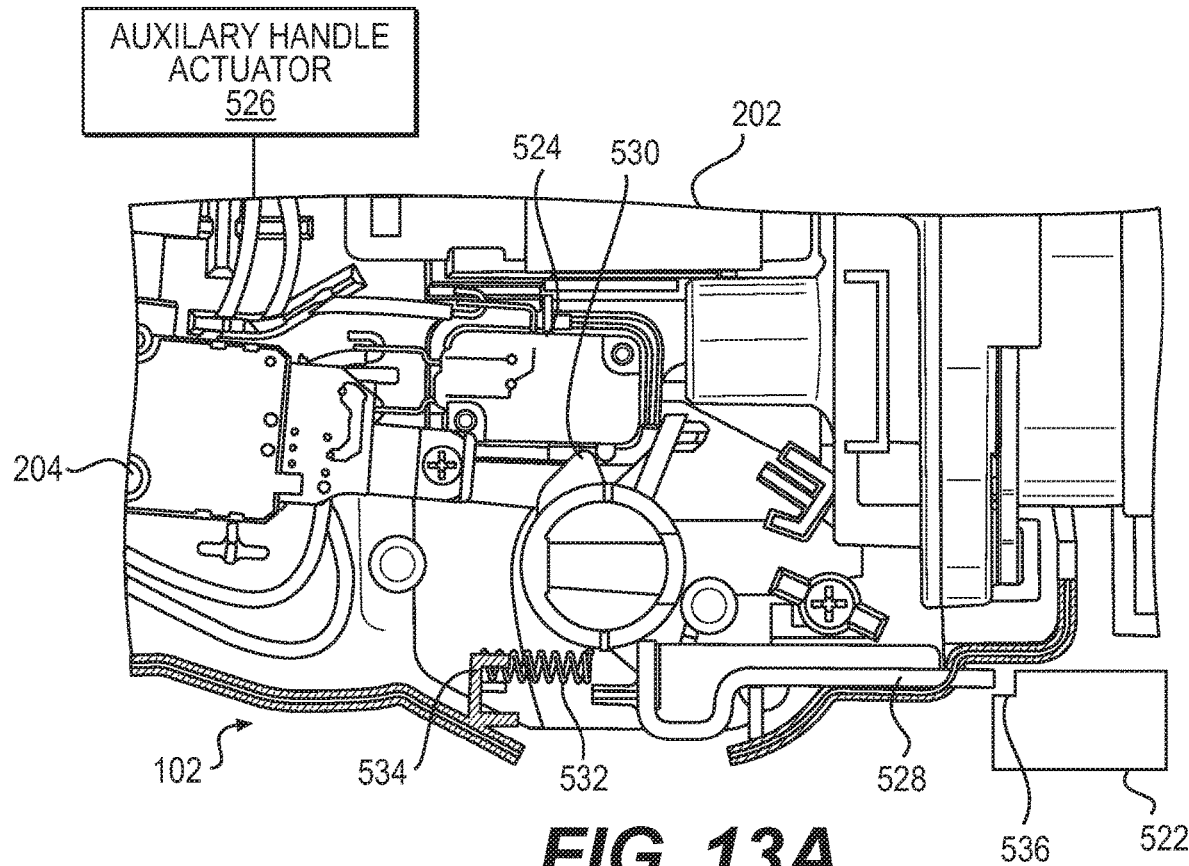
FIGS. 13A and 13B, respectively, show side views of a portion of a motor housing and a portion of an attachment component during two stages of operation according to another embodiment of the present disclosure.
Figure 13B:
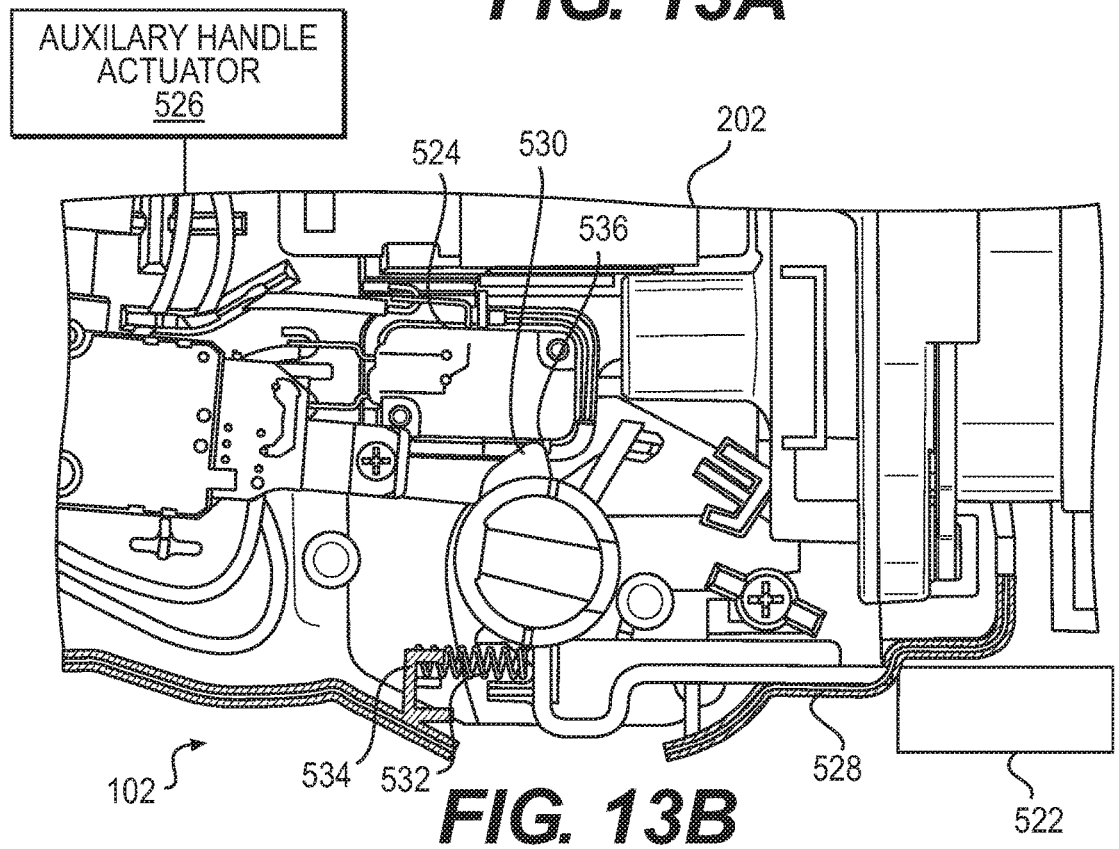

Now an override feature for the trigger mechanism will be discussed. With reference now to FIGS. 13A and 13B, there are respectively shown side views of a portion of a motor housing 102 during two stages of operation according to an embodiment of the present disclosure. As shown in FIGS. 13A and 13B, an override switch 524 is provided to function as an override to the motor switch 204. That is, when the override switch 524 is an active state, as is shown in FIG. 13A, the motor switch 204 may not automatically activate the electric motor 202 when the trigger mechanism 206 (shown in FIG. 5) is depressed. The override switch 524 may be function as a safety mechanism to prevent the electric motor 202 from being operational when the attachment component 104 is directly attached to the motor housing 102, unless an auxiliary handle actuator 526 is depressed. That is, when the attachment component 104 is directly attached to the motor housing 102, i.e., without the extension pole 120, a user may be required to hold the handle 208 with one hand and to hold the auxiliary handle 226 with the other hand in order for the electric motor 202 to be operational. In this regard, when the override switch 524 is in an active state, the motor switch 204 may activate the electric motor 202 if an actuator 526 on an auxiliary handle 226 is depressed concurrently with the trigger mechanism 206. In other words, the motor switch 204 may not activate the electric motor 202 unless both the trigger mechanism 206 and the auxiliary handle actuator 526 are depressed.

Also shown in FIGS. 13A and 13B are an override tab 528 and an override lever 530. The override tab 528 may extend out of the motor housing 102 and may be biased to the position shown in FIG. 13A by an override spring 532 being pressed against an override spring post 534. In the example depicted in FIG. 13A, an attachment component 104 may be attached directly to the motor housing 102. As the attachment component 104 will be relatively close to the user during use in the example shown in FIG. 13A, the override switch 524 may remain in the active state to thus require that a user grasp the power tool 100 with both of their hands. In this regard, a projection 522 of the attachment component 104 that is adjacent to the end of the override tab 528 may include a notch 536 to prevent the projection 522 of the attachment component 104 from pressing the override tab 528 and deactivating the override switch 524.

In the example depicted in FIG. 13B, the attachment component 104 is an extension pole 120, for instance, as shown in FIGS. 2A-2C and 9. As such, an attachment component 104 may be attached at the opposite end of the extension pole 120. As the extension pole 120 enables the attachment component 104 to be positioned relatively far away from the user during use in the example shown in FIG. 13B, the override switch 524 may be placed into an inactive state when the extension pole 120 is attached to the motor housing 102. In the inactive state, the override switch 524 may not prevent the motor switch 204 from activating the electric motor 202 when the trigger mechanism 206 is depressed. In other words, the auxiliary handle actuator 526 may not need to be depressed concurrently with the trigger mechanism 206 for the motor switch 204 to activate the electric motor 202 when the override switch 524 is in the inactive state.

As shown in FIG. 13B, the override switch 524 may be placed into the inactive state when the override tab 528 is moved, for instance, by the projection 522 of the extension pole 120 pressing onto the override tab 528. That is, movement of the override tab 528 causes the override lever 530 to be rotated and press an actuator 536 on the override switch 524, in which pressing of the actuator 536 causes the override switch 524 to be activated. In this regard, the projection 522 of the extension pole 120 that is adjacent to the end of the override tab 528 may press the override tab 528.

Figure 13C:
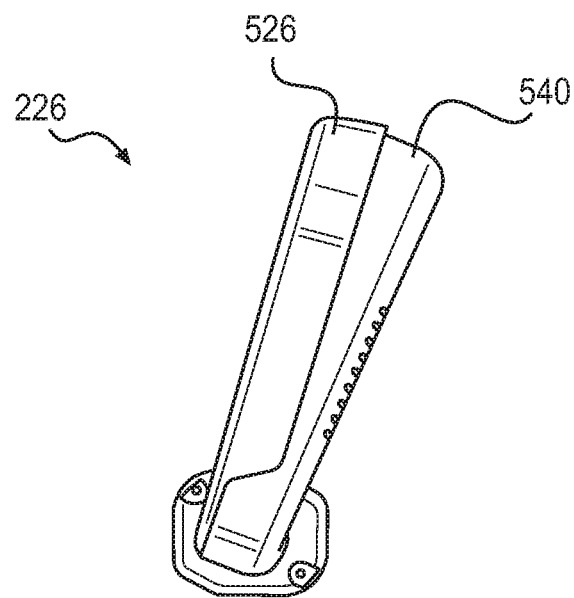
FIGS. 13C and 13D, respectively, show an auxiliary handle and auxiliary handle actuator according to an embodiment of the present disclosure.
Figure 13D:
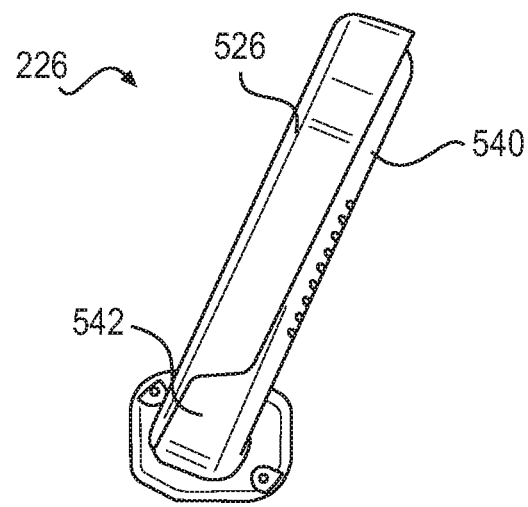

An example of the auxiliary handle 226 and the auxiliary handle actuator 526 are depicted in FIGS. 13C and 13D. Particularly, the auxiliary handle 226 is depicted as including the auxiliary handle actuator 526 and a stationary part 540. The auxiliary handle actuator 526 is movable with respect to the stationary part 540 about a pivot point 542. A user may activate the auxiliary handle actuator 526 by pressing the auxiliary handle actuator 526 against the stationary part 540. Activation of the auxiliary handle actuator 526 may cause a signal to be sent to the motor switch 204 such that the motor switch 204 may cause the electric motor 202 to rotate when the override switch 524 is active.

Figure 14A:
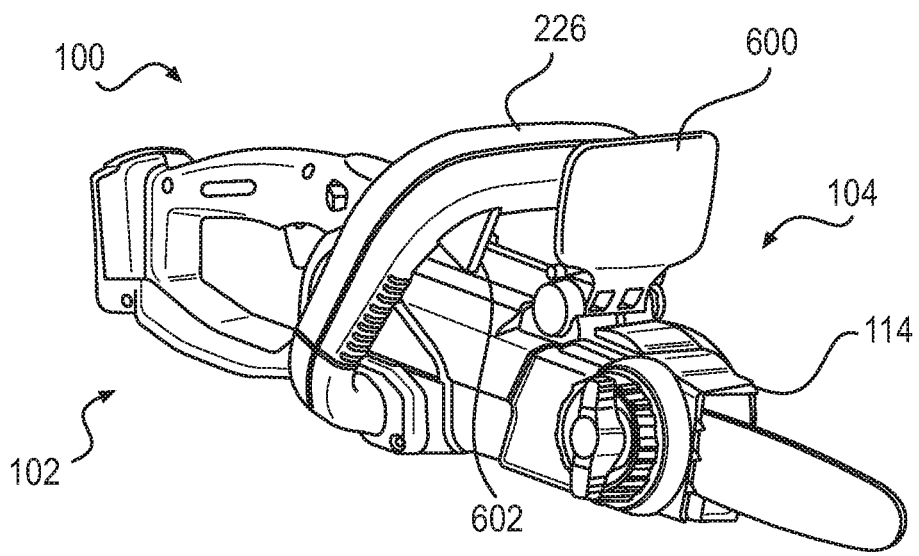
FIGS. 14A and 14B, respectively, show perspective views, partially in cross-section, of the power tool according to an embodiment of the present disclosure.
Figure 14B:
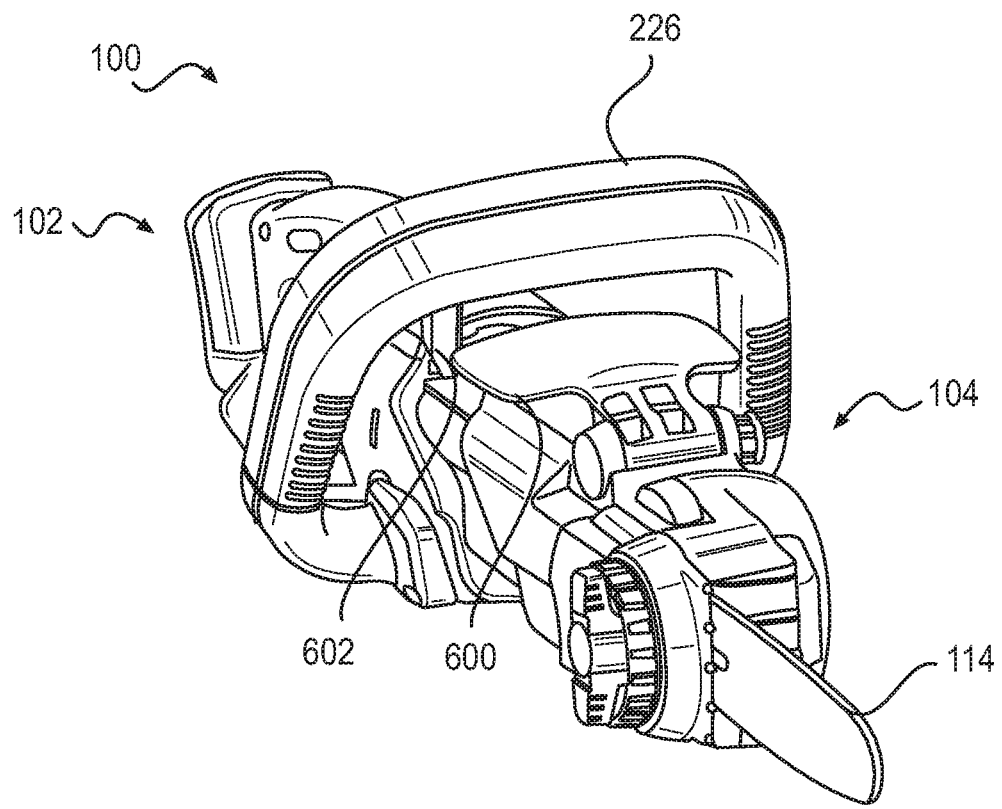

A lockout feature for the chainsaw attachment is now discussed. Turning to FIGS. 14A and 14B, there are respectively shown perspective views, partially in cross-section, of the power tool 100 according to an embodiment of the present disclosure. As shown, the attachment component 104 is a chainsaw attachment 114 and includes a folding guard 600. In addition, the motor housing 102 is depicted as including a blocking element 602. In FIG. 14A, the folding guard 600 is depicted as being in an upright position and the attachment component 104 is depicted as being fully engaged with the motor housing 102. In FIG. 14B, the folding guard 600 is depicted as being in a folded position and the blocking element 602 is depicted as preventing the attachment component 104 from engaging the motor housing 102. That is, when the folding guard 600 is in the folded position as shown in FIG. 14B, the blocking member 602, which may be attached to the auxiliary handle 226, interferes with the folding guard 600 and prevents the attachment component 104 from mating with the motor housing 102. In this regard, the folding guard 600 may be required to be in the upright position for the attachment component 104 to be mated directly to the motor housing 102.

As such, a user may be unable to use the power tool 100 with the chainsaw attachment 114 unless the guard 600 is in the upright position to protect the user. However, when an extension pole 120 is mounted to the motor housing 102 and the chainsaw attachment 114 as shown, for instance, in FIG. 2B, the chainsaw attachment 114 may be attached to the extension pole 120 with the guard 600 in either the folded or the upright position. It may be desirable to keep the guard 600 in the folded position when the chainsaw attachment 114 is attached to the extension pole 120, for instance, to prevent the guard 600 from becoming tangled with tree branches.

Figure 15A:
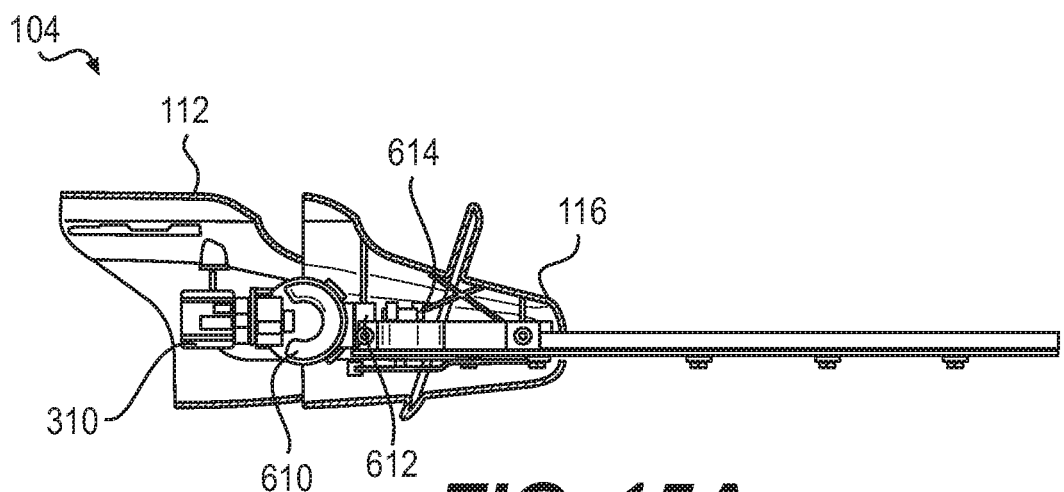
FIGS. 15A-15C respectively show side cut-away views of an attachment component according to an embodiment of the present disclosure.
Figure 15B:
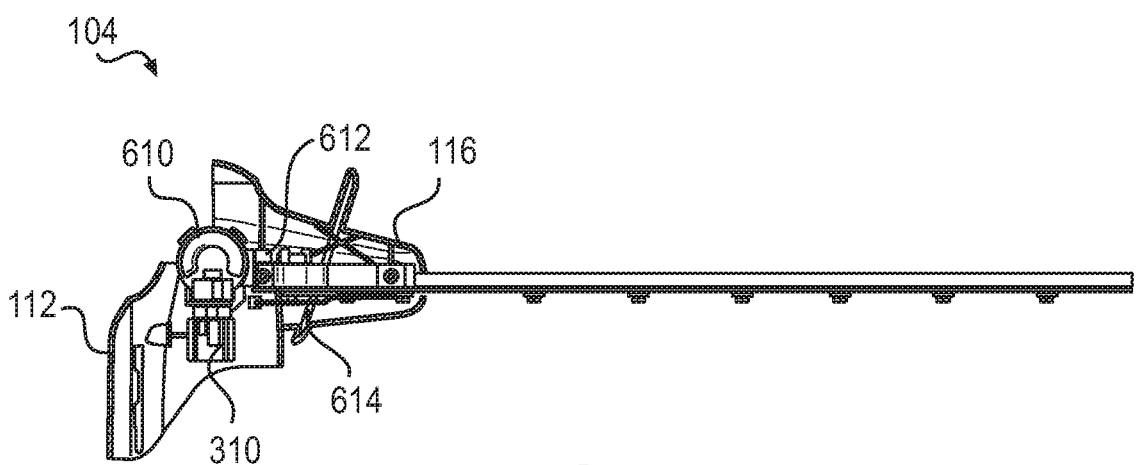
Figure 15C:
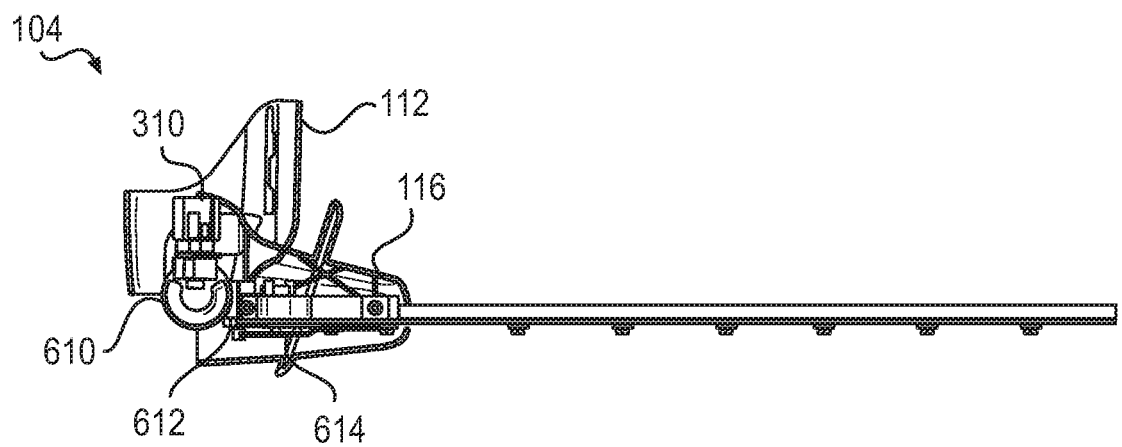
Figure 16A:
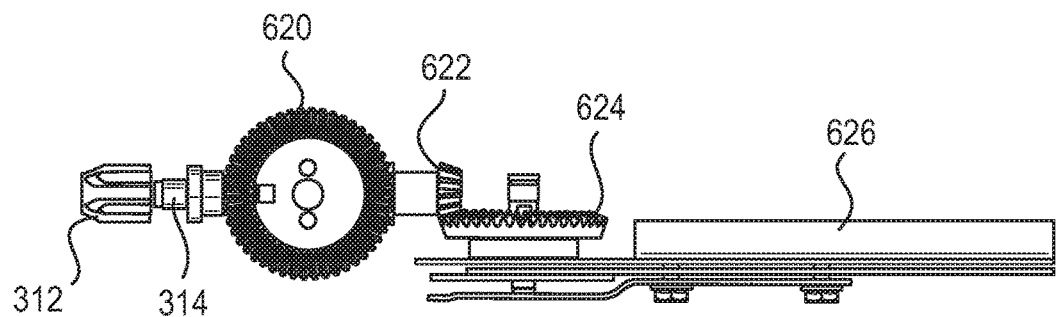
FIGS. 16A-16C respectively show portions of interior elements of the attachment component depicted in FIGS. 15A-15C.
Figure 16B:
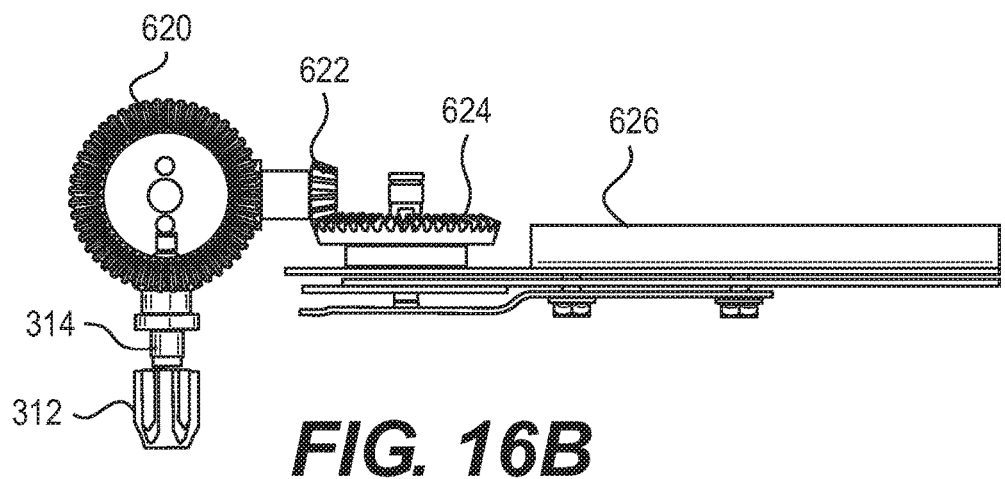
Figure 16C:
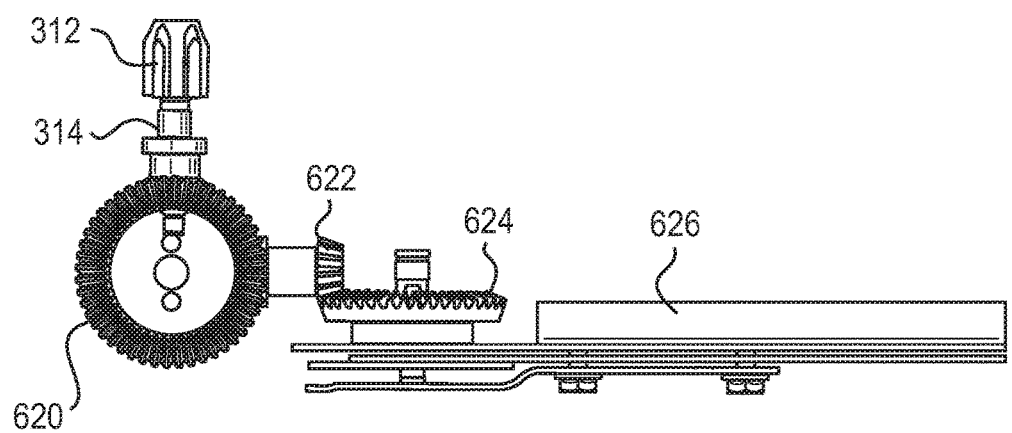

Reference is now made to FIGS. 15A-15C and 16A-16C. FIGS. 15A-15C respectively show side cut-away views of an attachment component 104 according to an embodiment of the present disclosure. FIGS. 16A-16C respectively show portions of interior elements of the attachment component 104 depicted in FIGS. 15A-15C. Particularly, FIGS. 16A-16C correspond to FIGS. 15A-15C respectively. The attachment component 104 depicted in FIGS. 15A-15C is a hedge trimmer attachment 116 and the connection member 310 discussed above are shown in FIGS. 15A-15C. Additionally, in FIGS. 15A-15C and 16A-16C, the connection member 310 is depicted as being connected to a casing 610 for a rotational gear 620. The hedge trimmer 116 is also depicted as including a casing 612 for a pinion 622 and a casing 614 for a gear 624. As shown in FIGS. 15B, 15C, 16B, and 16C, the casing 610 may enable the rotational gear 620 to rotate with respect to the pinion 622. Additionally, those figures show that the rotational gear 620 may be rotated in either direction with respect to the input shaft 314, for instance, 90 degrees in either direction with respect to the angle shown in FIG. 16A, to enable a trimmer blade 626 to be rotated in multiple angles with respect to the input shaft 314.

As shown in FIGS. 16A-16C, an input shaft 314 extends from a drive pinion 312, which is to be connected to an output shaft 248 of a motor housing 102 as discussed above. The input shaft 314 is also depicted as terminating with teeth that engage the teeth of the rotational gear 620. As such, rotation of the output shaft 248 causes the input shaft 314 to rotate, which causes the rotational gear 620 to rotate. Rotation of the rotational gear 620 causes the pinion 622 to rotate, which causes the gear 624 to rotate. In addition, rotation of the gear 624 causes teeth in the hedge trimmer 116 to articulate. In one regard, FIGS. 15A-15C and 16A-16C depict that the cutting features of the hedge trimmer 116 may be rotated into different directions while remaining operable.

Generally speaking, the arrangements shown in FIGS. 15A-15C and 16A-16C enable the articulating head of the hedge trimmer 116 to be aligned with the extension pole 120. As such, the power tool 100 may maintain its balance when the hedge trimmer 116 is attached to the motor housing 102. In contrast, other types of hedge trimmers are offset with respect to an extension pole 120, which may cause such hedge trimmers to be imbalanced.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A modular power tool comprising:
a motor housing including, an electric motor and a drive member connected to the electric motor, the drive member being connected to a drive coupler;
an extension pole including an input shaft having a first end connector and a second end connector, wherein the first end connector is configured to mate with the drive coupler;
an attachment component having an attachment connector and a working implement, wherein the attachment component is configured to mate with either of the drive coupler or the second end connector;
a motor housing locking ring having a plurality of locking pins, the motor housing locking ring being rotatably mounted to the motor housing;
the extension pole having a connection member having a plurality of detents that are configured for releasable engagement with the plurality of motor housing locking pins in the first end connector and an extension pole locking ring having a plurality of locking pins in the second end connector; and
an attachment component connection member having a plurality of detents that are configured for releasable engagement with the plurality of locking pins of either the motor housing locking ring or the extension pole locking ring.

2. The modular power tool according to claim 1, further comprising:
the motor housing locking ring having a lever that is depressed to release the plurality of detents of the extension pole or the attachment component from the plurality of motor housing locking pins; and
the extension pole locking ring having a lever that is depressed to release the plurality of detents of the attachment component connection member from the plurality of extension pole locking pins, wherein the extension pole includes a first cutout and the attachment component includes a second cutout, and wherein the lever is accessible through the first and second cutouts.

3. The modular power tool according to claim 1, further comprising:
an extension pole sheath that is configured to mate with the motor housing to form a unitary power tool housing, wherein a mating surface of the extension pole sheath to the motor housing is non-planar; and
an attachment component sheath that is configured to mate with either the motor housing or the extension pole to form a unitary component, wherein a mating surface of the attachment component sheath to the motor housing or the extension pole is non-planar.

4. The modular power tool according to claim 3, wherein the motor housing includes a groove, the extension pole sheath includes a support rail and the attachment component sheath includes a support rail, and wherein the support rail of the extension pole sheath and the support rail of the attachment component sheath are configured to be inserted into the groove.

5. The modular power tool according to claim 1, further comprising:
a blocking element mounted to the motor housing; and
a folding guard mounted to the attachment component, wherein the folding guard is rotatable between an upright position and a folded position and wherein the blocking element is positioned to block the folding guard and prevent mating of the attachment component to the motor housing when the folding guard is in the folded position.

6. The modular power tool according to claim 1, further comprising:
an override switch in the motor housing that prevents the electric motor from operating when activated; and
the extension pole having a feature to deactivate the override switch when the extension pole is attached to the motor housing.

7. The modular power tool according to claim 6, further comprising:
an auxiliary handle mounted to the motor housing; and
an auxiliary handle actuator provided on the auxiliary handle, wherein depressing of the auxiliary handle actuator deactivates the override switch.

8. The modular power tool according to claim 1, wherein the attachment component is a hedge trimmer having a rotational gear and a trimmer blade, wherein the rotational gear is configured to rotate the trimmer blade in multiple angles with respect to the drive member.

9. A modular power tool comprising:
an attachment component having a connection member;
an extension pole having a connection member;
a motor housing including an electric motor, a drive member connected to the electric motor, a connection coupler having an opening, wherein the drive member extends through the opening and a locking ring configured to couple the connection member of either the extension pole or the attachment component to the connection coupler when the locking ring is in an engaged position and to free the connection member from the connection coupler when the locking ring is in a disengaged position;
wherein the extension pole includes an extension pole locking ring configured to releasably couple the connection member of the attachment component to the extension pole; and
wherein the locking ring is rotatably mounted to the connection coupler and includes at least one locking pin, wherein the connection member of the attachment component and the extension pole each comprises at least one protrusion extending from a surface of the connection member, the at least one protrusion including a ramp and a detent, and wherein the locking pin is to slide along the ramp and engage the detent during insertion of the connection member into the locking ring to engage the connection member of either the attachment component or the extension pole to the connection coupler.

10. The modular power tool according to claim 9, wherein the locking ring includes a locking ring lever, wherein application of pressure on the locking ring lever causes the locking ring to move from the engaged position to the disengaged position and wherein the locking ring is biased toward the engaged position when pressure is not applied on the locking ring lever.

11. The modular power tool according to claim 9, further comprising:
an extension pole sheath that is configured to mate with the motor housing to form a unitary power tool housing, wherein a mating surface of the extension pole sheath is non-planar; and
an attachment component sheath that is configured to mate with either the motor housing or the extension pole to form a unitary component, wherein a mating surface of the attachment component sheath is non-planar.

12. The modular power tool according to claim 9, further comprising:
a blocking element mounted to the motor housing; and
a folding guard mounted to the attachment component, wherein the folding guard is rotatable between an upright position and a folded position and wherein the blocking element is positioned to block the folding guard and prevent mating of the attachment component to the motor housing when the folding guard is in the folded position.

13. The modular power tool according to claim 9, further comprising:
an override switch in the motor housing that prevents the electric motor from operating when activated; and
the extension pole having a feature to depress an override tab that deactivates the override switch when the extension pole is attached to the motor housing.

14. A modular power tool comprising:
a motor housing having an electric motor, a drive member to be driven by the electric motor, the drive member being connected to a drive coupler, a locking ring having a plurality of locking pins, the locking ring being movable relative to the motor housing;
an extension pole having an input shaft having a first end connector and a second end connector, wherein the first end connector is to mate with the drive coupler, a plurality of detents to releasably engage the plurality of locking pins, an extension pole locking ring having a plurality of locking pins, the extension pole locking pins being movable relative to the extension pole; and
an attachment component having, an attachment connector to releasably connect to one of the first end connector and the drive coupler and a plurality of detents to releasably engage either the plurality of locking pins of the motor housing or the plurality of locking pins of the extension pole locking ring.

15. The modular power tool according to claim 14, further comprising:
an extension pole sheath that is configured to mate with the motor housing to form a unitary power tool housing, wherein a mating surface of the extension pole sheath to the motor housing is curved;
an attachment component sheath that is configured to mate with either the motor housing or the extension pole to form a unitary component, wherein a mating surface of the attachment component sheath to the motor housing or the extension pole is curved.

16. The modular power tool according to claim 14, further comprising:
an override switch in the motor housing that prevents the electric motor from operating when activated; and
the extension pole having a feature to depress an override tab that deactivates the override switch when the extension pole is attached to the motor housing.

17. The modular power tool according to claim 16, further comprising:
an auxiliary handle mounted to the motor housing; and
an auxiliary handle actuator provided on the auxiliary handle, wherein depressing of the auxiliary handle actuator deactivates the override switch.

18. The modular power tool according to claim 14, wherein the attachment component is a hedge trimmer having a rotational gear and a trimmer portion, wherein the rotational gear is configured to rotate the trimmer portion in multiple angles with respect to the drive member.

* * * * *